(12) United States Patent
Kim et al.

(10) Patent No.: US 10,742,468 B2
(45) Date of Patent: Aug. 11, 2020

(54) METHOD AND APPARATUS FOR TRANSCEIVING A SIGNAL IN A WIRELESS COMMUNICATION SYSTEM SUPPORTING ZONE-BASED COMMUNICATION

(71) Applicant: LG ELECTRONICS INC., Seoul (KR)

(72) Inventors: Sanggook Kim, San Diego, CA (US); Ki-Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/315,295

(22) PCT Filed: Jul. 7, 2017

(86) PCT No.: PCT/KR2017/007334
§ 371 (c)(1),
(2) Date: Jan. 4, 2019

(87) PCT Pub. No.: WO2018/009044
PCT Pub. Date: Jan. 11, 2018

(65) Prior Publication Data
US 2019/0215214 A1 Jul. 11, 2019

Related U.S. Application Data

(60) Provisional application No. 62/359,689, filed on Jul. 7, 2016.

(51) Int. Cl.
*H04W 4/00* (2018.01)
*H04L 27/26* (2006.01)
(Continued)

(52) U.S. Cl.
CPC ..... *H04L 27/2646* (2013.01); *H04B 7/15521* (2013.01); *H04B 7/185* (2013.01);
(Continued)

(58) Field of Classification Search
CPC .............. H04W 72/042; H04W 76/27; H04W 72/0453; H04L 5/0053; H04L 5/0007
See application file for complete search history.

(56) References Cited

U.S. PATENT DOCUMENTS

2011/0090983 A1* 4/2011 Zhang ................. H04L 27/2607
375/295
2011/0110337 A1 5/2011 Grant et al.
(Continued)

FOREIGN PATENT DOCUMENTS

KR 10-2011-0019330 A 2/2011
WO 2012044742 A1 4/2012

*Primary Examiner* — Atique Ahmed
(74) *Attorney, Agent, or Firm* — Dentons US LLP

(57) ABSTRACT

The present disclosure is a method for transmitting and receiving a signal in a wireless communication system supporting a zone-based communication, the method performed in a drone, comprising: receiving a plurality of control signals from one or more base stations included in at least one cluster; combining the received control signals; and transmitting data to one or more base stations or perform a specific operation based on the combined control signal, and wherein the at least one cluster is included in a zone defined as a predetermined set of base stations for the drone.

18 Claims, 14 Drawing Sheets

(51) Int. Cl.
   *H04W 84/06*    (2009.01)
   *H04L 5/00*     (2006.01)
   *H04B 7/185*    (2006.01)
   *H04B 7/155*    (2006.01)
   *H04W 76/15*    (2018.01)
   *H04W 16/28*    (2009.01)

(52) U.S. Cl.
   CPC .......... *H04L 5/0035* (2013.01); *H04L 5/0053* (2013.01); *H04L 27/26* (2013.01); *H04L 27/2602* (2013.01); *H04L 27/2607* (2013.01); *H04W 16/28* (2013.01); *H04W 76/15* (2018.02); *H04W 84/06* (2013.01)

(56) References Cited

U.S. PATENT DOCUMENTS

| | | | |
|---|---|---|---|
| 2012/0039287 A1* | 2/2012 | Ko | H04L 5/0053 370/329 |
| 2012/0113962 A1* | 5/2012 | Jen | H04L 1/16 370/336 |
| 2012/0165034 A1* | 6/2012 | Boudreau | H04W 72/042 455/453 |
| 2013/0044722 A1* | 2/2013 | Kang | H04L 1/1861 370/329 |
| 2013/0077521 A1* | 3/2013 | Feng | H04W 36/0083 370/252 |
| 2013/0176952 A1* | 7/2013 | Shin | H04W 72/042 370/329 |
| 2013/0343314 A1* | 12/2013 | Tiirola | H04L 5/0016 370/329 |
| 2014/0010182 A1* | 1/2014 | Chunli | H04L 5/0048 370/329 |
| 2014/0044061 A1* | 2/2014 | Yue | H04W 72/042 370/329 |
| 2016/0082460 A1* | 3/2016 | McMaster | B05B 9/007 701/2 |
| 2016/0134358 A1 | 5/2016 | Jalali et al. | |
| 2016/0150525 A1* | 5/2016 | Xu | H04W 74/006 370/329 |
| 2016/0161258 A1 | 6/2016 | Magson et al. | |
| 2016/0212750 A1* | 7/2016 | Xu | H04W 4/70 |
| 2016/0338018 A1* | 11/2016 | Awad | H04W 4/70 |

* cited by examiner

[Figure 1]
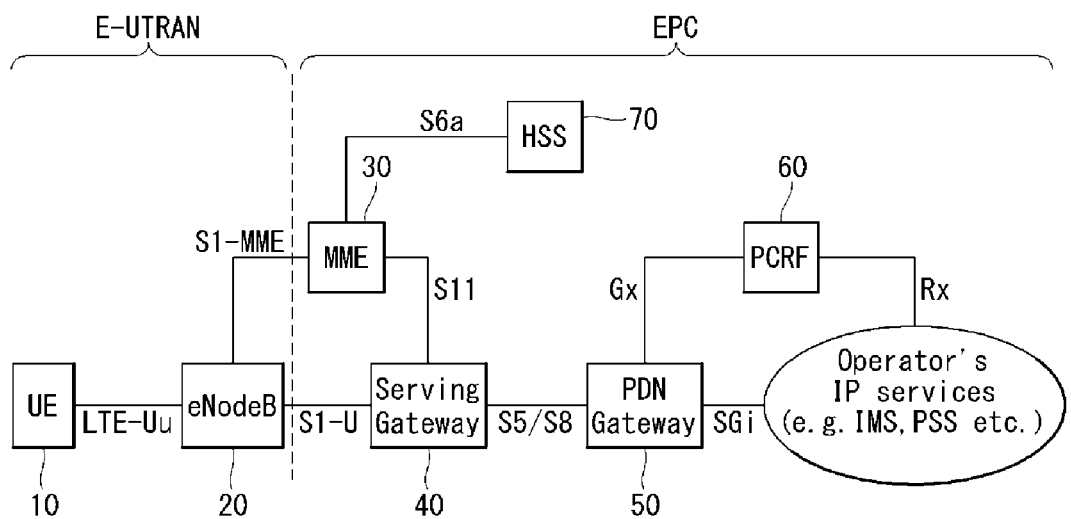

[Figure 2]
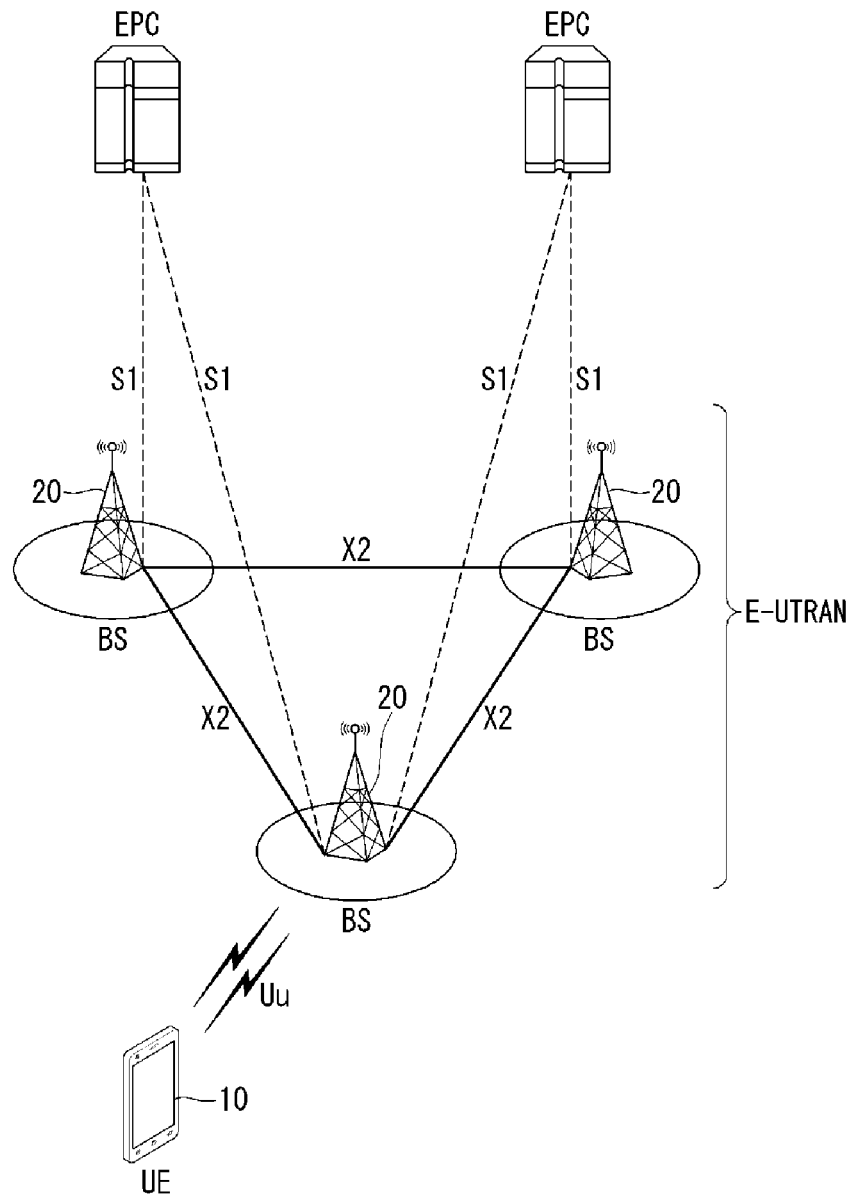

[Figure 3]
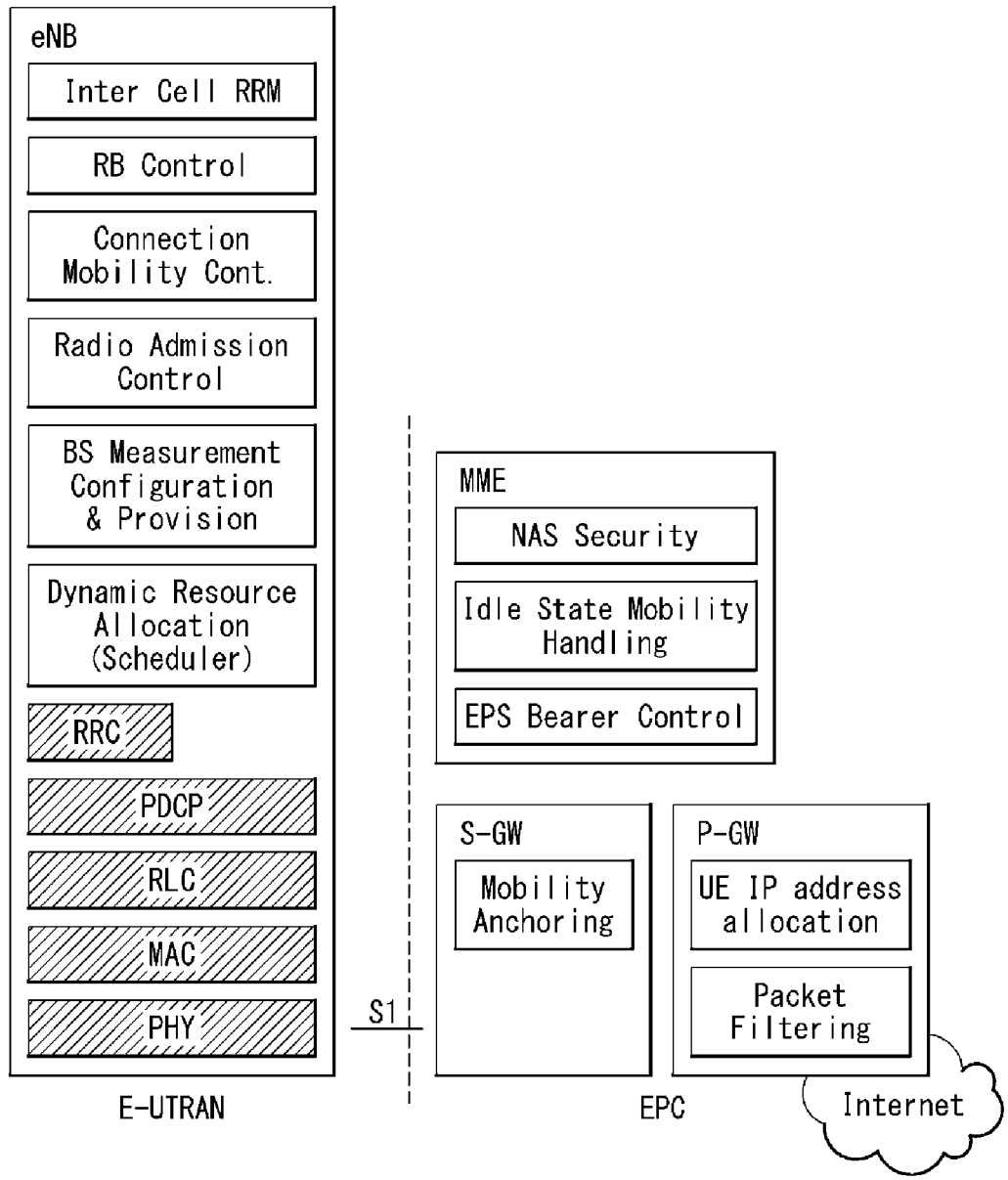

[Figure 4]
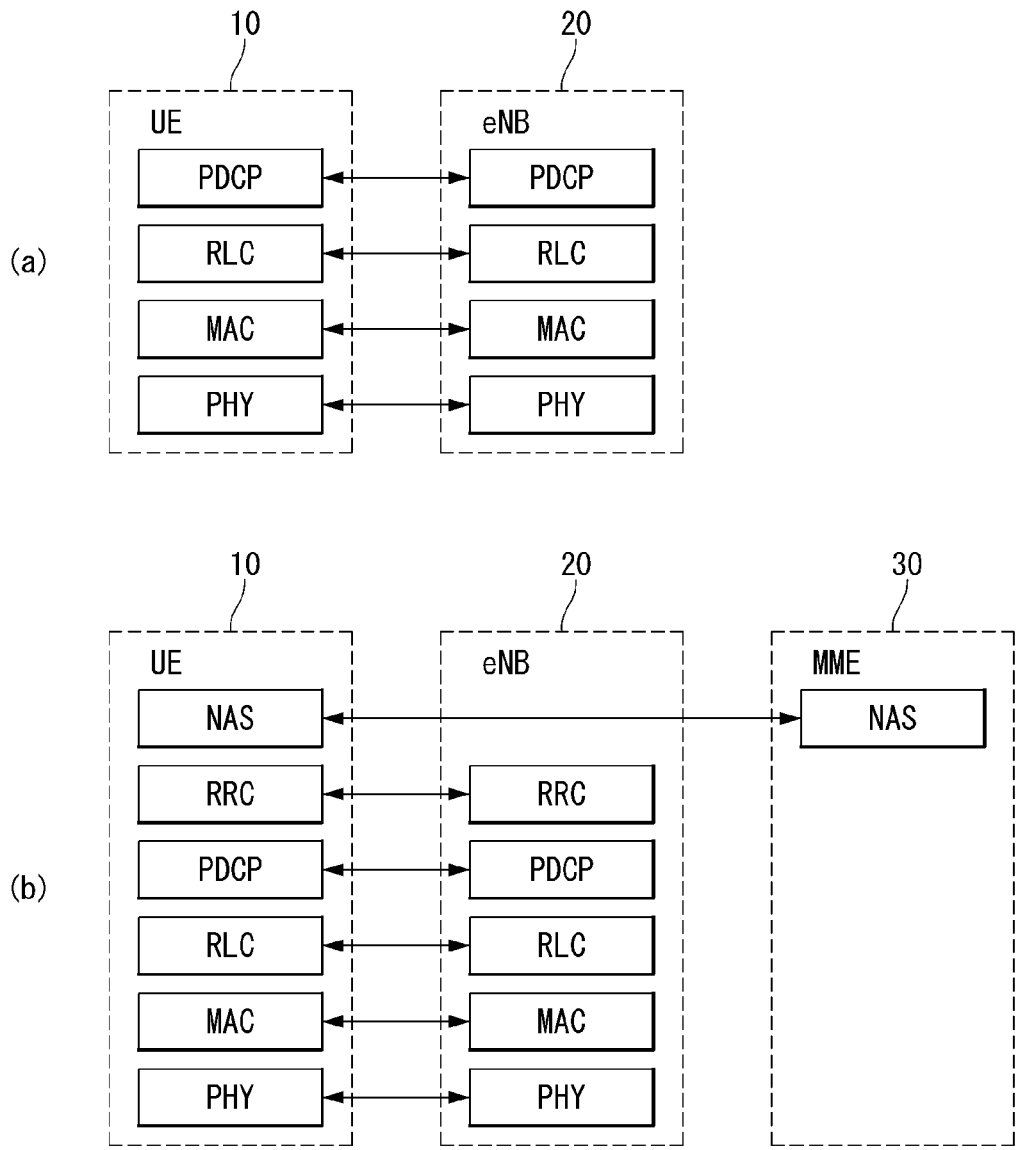

[Figure 5]
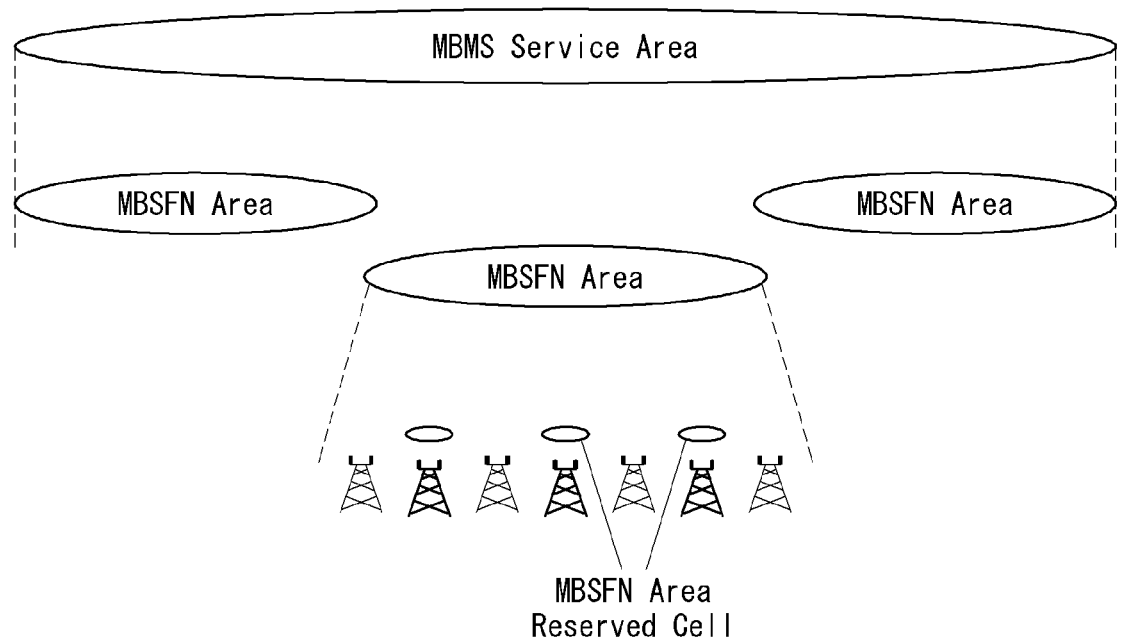

[Figure 6]
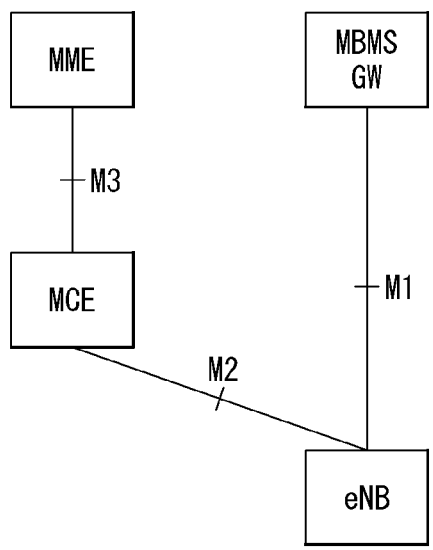
MBMS GW: MBMS Gateway
MCE: Multi-Cell/Multicast Coordination Entity
M1: user plane interface
M2: E-UTRAN internal control plane interface
M3: control plane interface between E-UTRAN and EPC

[Figure 7]
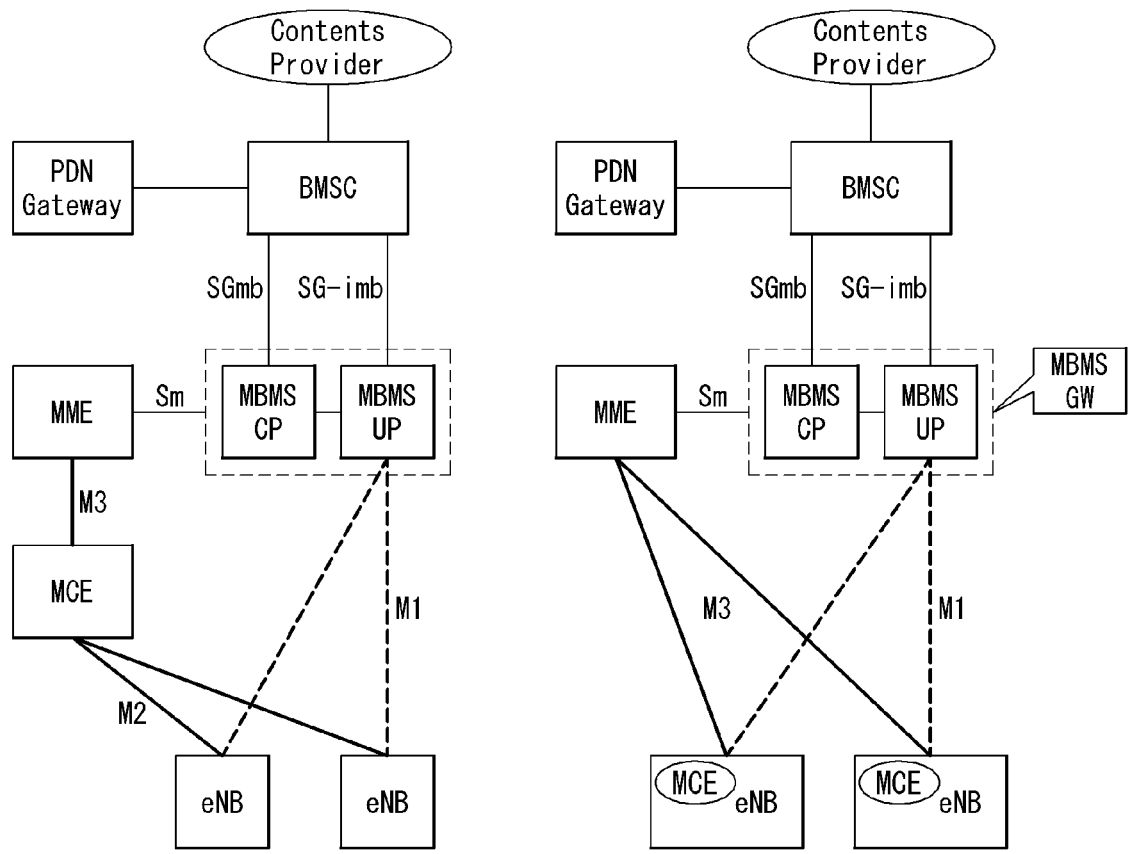

[Figure 8]
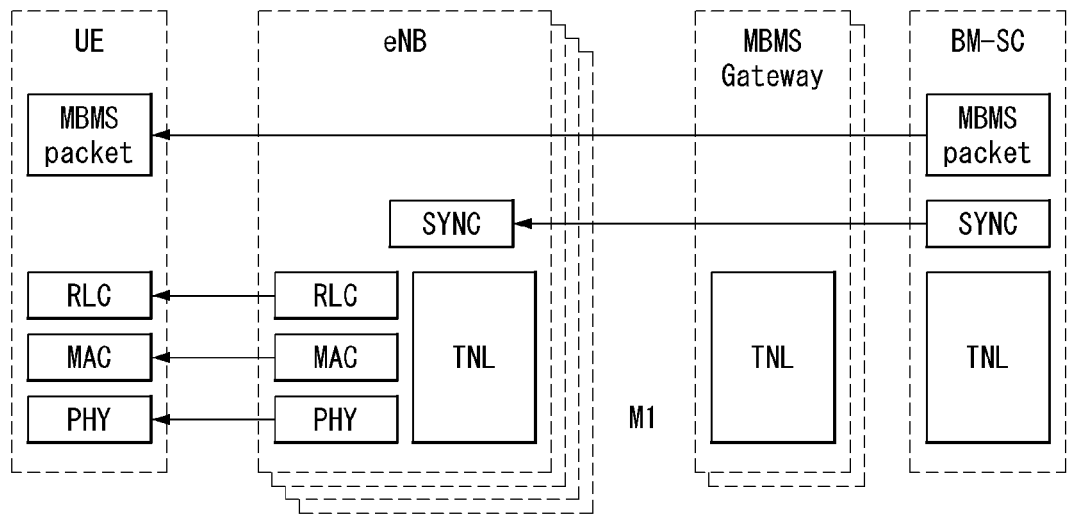
SYNC: Protocol to synchronise data used to generate a certain radio frame
[Figure 9]
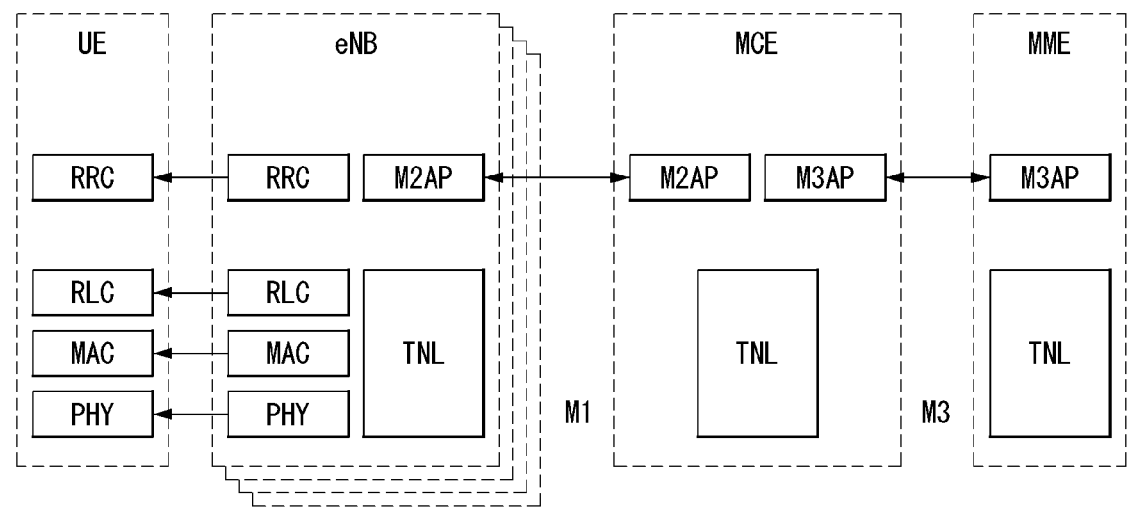

[Figure 10]
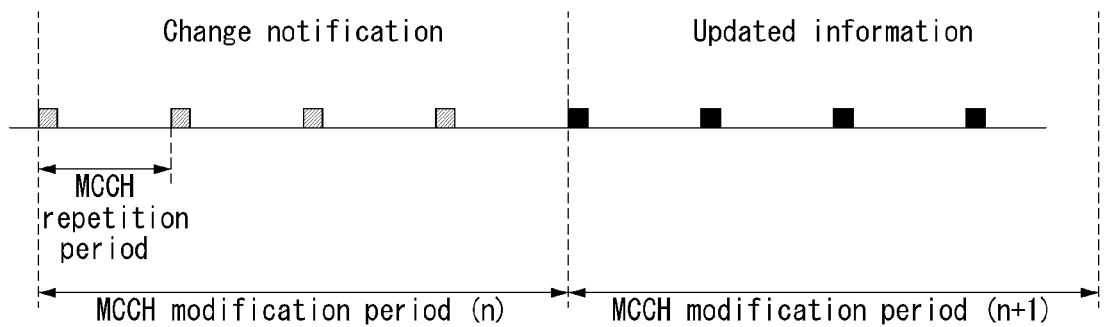
[Figure 11]
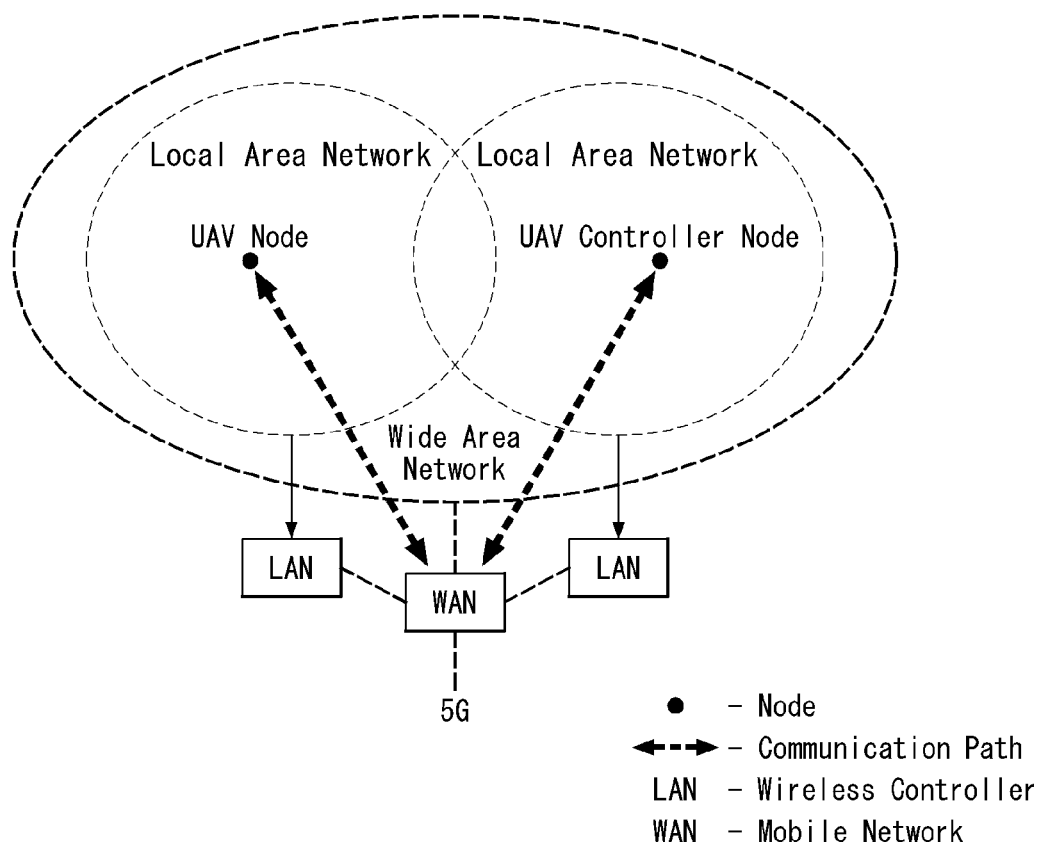

[Figure 12]
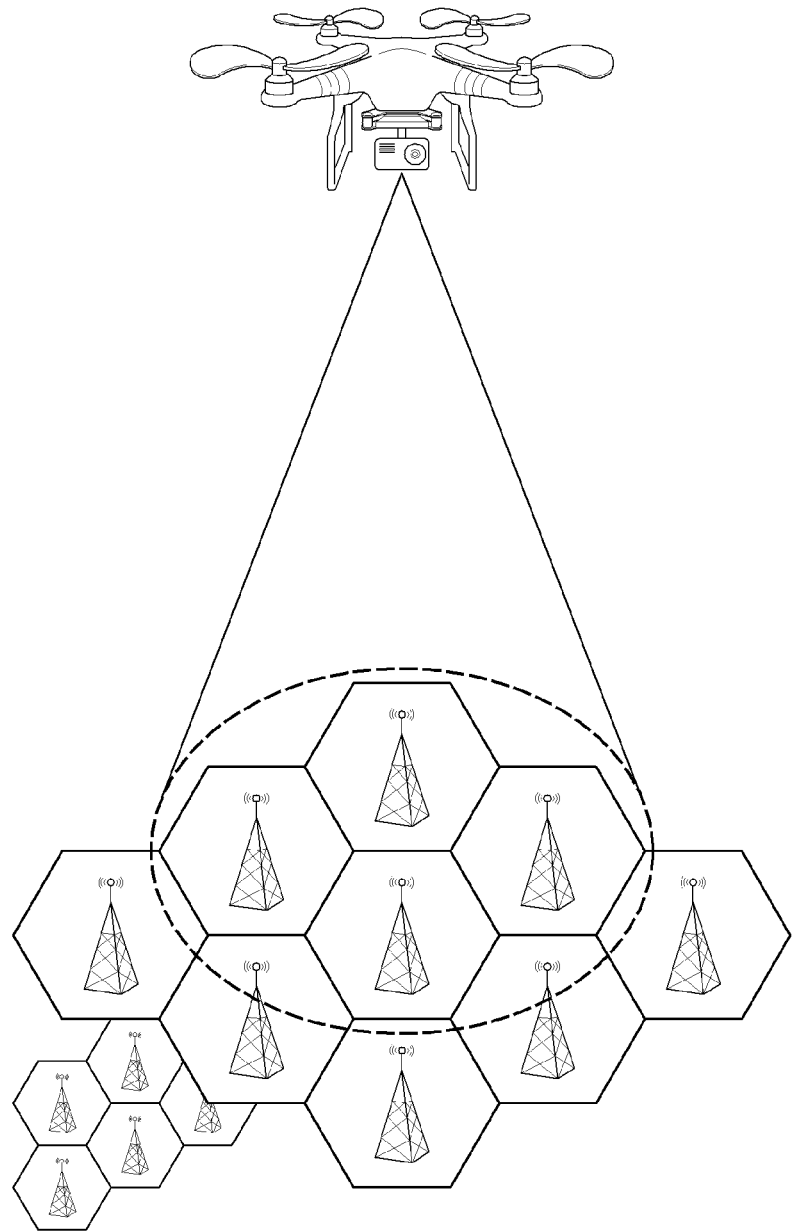

[Figure 13]
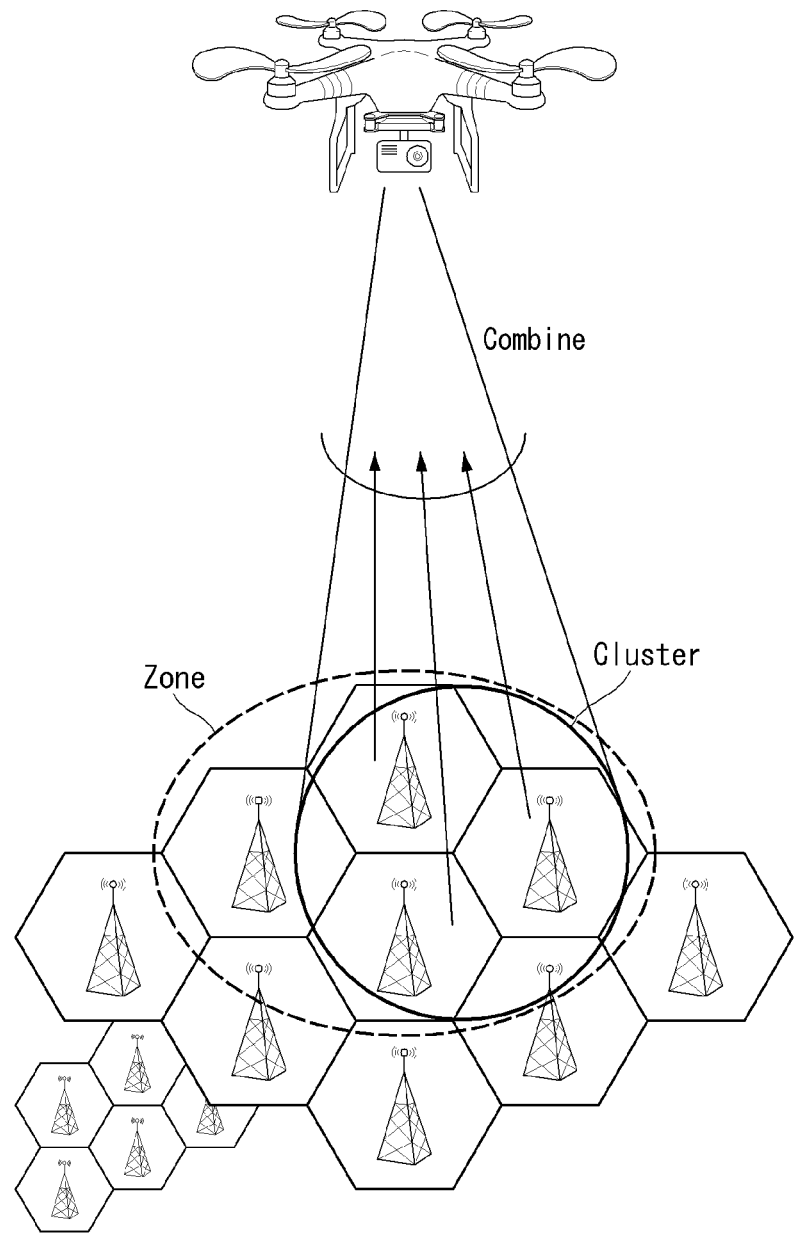

[Figure 14]
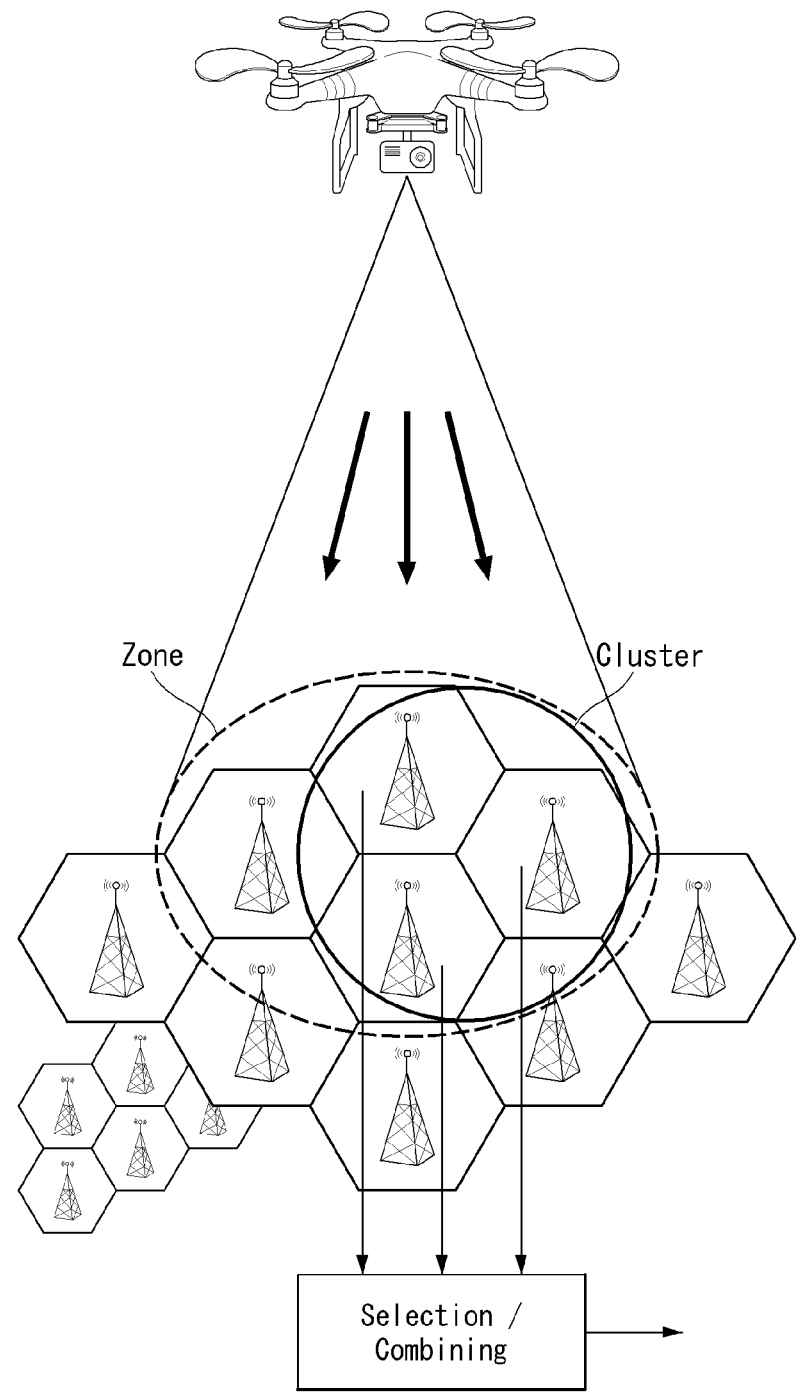

[Figure 15]
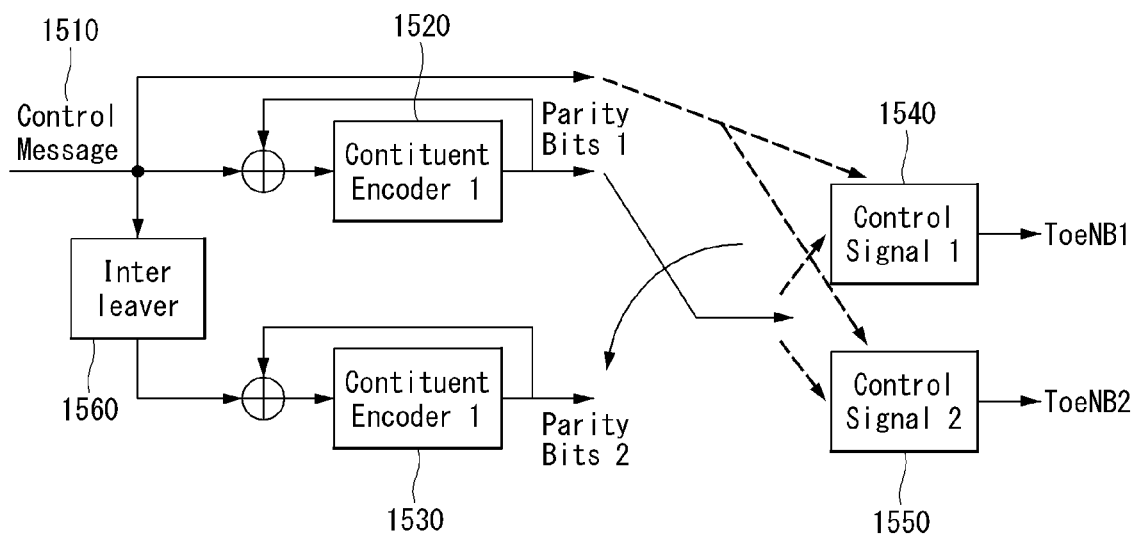
[Figure 16]
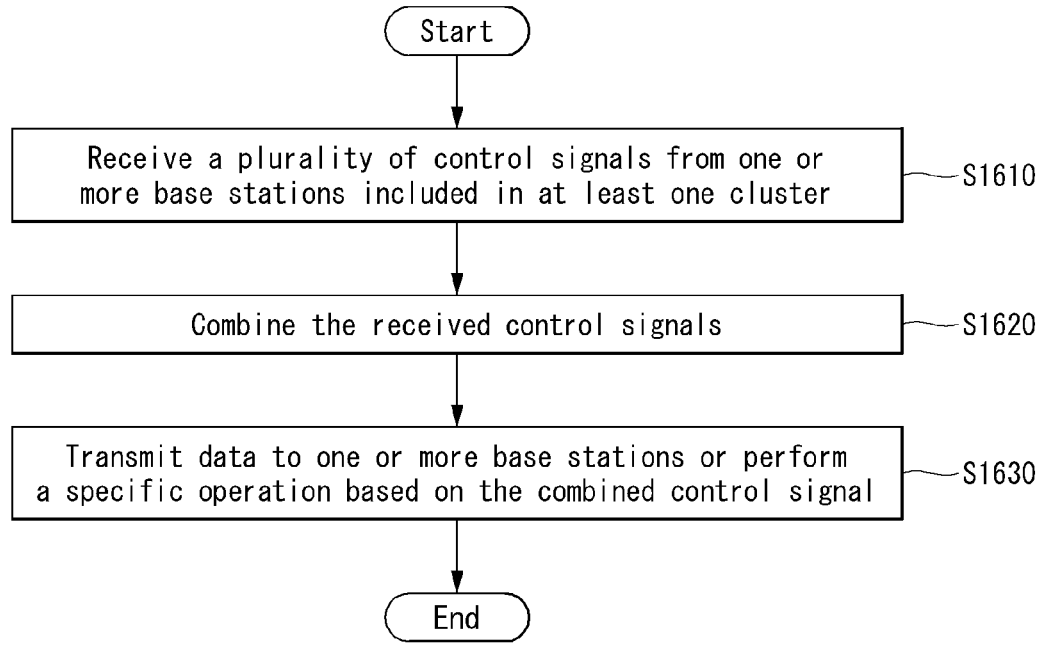

[Figure 17]
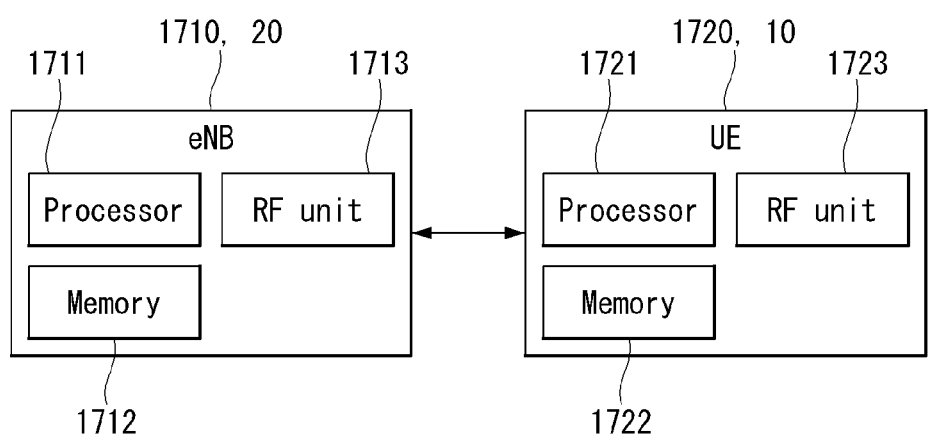

METHOD AND APPARATUS FOR TRANSCEIVING A SIGNAL IN A WIRELESS COMMUNICATION SYSTEM SUPPORTING ZONE-BASED COMMUNICATION

CROSS-REFERENCE TO RELATED APPLICATIONS

This application is the National Stage filing under 35 U.S.C. 371 of International Application No. PCT/KR2017/007334, filed on Jul. 7, 2017, which claims the benefit of U.S. Provisional Application No. 62/359,689 filed on Jul. 7, 2016, the contents of which are all hereby incorporated by reference herein in their entirety.

TECHNICAL FIELD

This specification relates to a method and apparatus for transceiving a signal in a wireless communication supporting zone-based communication.

BACKGROUND ART

Mobile communication systems have been developed to provide voice services while assuring users' activities. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support, or device networking.

DISCLOSURE

Technical Problem

This specification provides a method for transceiving a signal between a drone and base station(s) by defining a cluster and a zone.

Also, this specification provides a method for determining a base station that transceives a signal with a drone using at least one of velocity or trajectory information of the drone.

Objects to be achieved in this specification are not limited to the aforementioned advantages, and those skilled in the art to which the present invention pertains may evidently understand other objects from the following description.

Technical Solution

This specification provides a method for transmitting and receiving a signal in a wireless communication system supporting a zone-based communication.

The method is performed in a drone, and comprises receiving a plurality of control signals from one or more base stations included in at least one cluster; combining the received control signals; and transmitting data to one or more base stations or performing a specific operation based on the combined control signal, and wherein the at least one cluster is included in a zone defined as a predetermined set of base stations for the drone.

Furthermore, in this specification, the plurality of control signals includes the same control contents, and is repeatedly transmitted by the base stations.

Furthermore, in this specification, the plurality of control signals are sequentially transmitted by each of the base stations.

Furthermore, in this specification, when the plurality of control signals are sequentially transmitted, a sequence with which each of the control signals is transmitted is determined by at least one of a speed of the drone or trajectory information of the drone.

Furthermore, in this specification, the plurality of control signals includes at least one of an identifier of the at least one cluster or an identifier of the zone.

Furthermore, in this specification, the number of base stations which transmits the plurality of control signals is determined by a central resource controller or a serving base station.

Furthermore, in this specification, the serving base station is any one base station of the base stations.

Furthermore, in this specification, the number of base stations which transmits the plurality of control signals is determined based on at least one of signal quality of a drone, a speed of the drone, or trajectory information of the drone which is received from the base stations included in the at least one cluster.

Furthermore, in this specification, the specific operation is an operation for hovering the drone or an operation for safely landing the drones in emergency, Furthermore, in this specification, the method further comprises receiving information related base stations selected by the central resource controller.

Furthermore, in this specification, the plurality of control signals are modulated by using any one of OFDM (Orthogonal Frequency Division Multiplexing) scheme, OFDMA (Orthogonal Frequency Division Multiple Access) scheme, CDMA scheme, SDMA or SC-FDMA (Single-Carrier Frequency Division Multiple Access) scheme.

Furthermore, in this specification, duration of a cyclic prefix (CP) or a subcarrier spacing used in the plurality of control signals is categorized with a plurality of factors based on a specific factor influencing channel characteristics.

Furthermore, in this specification, the specific factor includes at least one of an altitude of the drone, a speed of the drone, or weather information.

Furthermore, in this specification, the duration of the CP used in the plurality of control signals is categorized with a first CP, a second CP, and a third CP based on the altitude of the drone, and the first CP is used at a low altitude and the second CP is used at a medium altitude, and the third CP is used at a high altitude.

Furthermore, in this specification, the plurality of control signals are spread orthogonally or pseudo-orthogonally.

Furthermore, in this specification, the data is received through at least one base station having the best signal quality among the base stations.

Furthermore, in this specification, the zone is an intra-zone or an inter-zone, and the number of base stations determined by the central resource controller is greater in the inter-zone than in the intra-zone.

Furthermore, in this specification, the number of base stations which transmits the plurality of control signals is different from the number of base stations which receives the data.

Furthermore, this specification provides a drone for transmitting and receiving a signal in a wireless communication system supporting a zone-based communication.

The drone comprises a radio frequency (RF) unit; and a process operatively coupled to the RF unit, wherein the processor is configured to control to: receive a plurality of control signals from one or more base stations included in at least one cluster; combine the received control signals; and transmit data to one or more base stations or perform a specific operation based on the combined control signal, wherein the at least one cluster is included in a zone defined as a predetermined set of base stations for the drone.

Advantageous Effects

In this specification, the signaling overhead between base stations is reduced by using a zone-based scheme for transceiving a signal between a drone and the base stations.

Also, the present invention has effect of maximizing an advantage of LOS transmission by determining one or more base stations to transceive with a drone using a speed, trajectory information, etc. of the drone.

Also, this specification has effect of increasing a diversity gain by transceiving a plurality of signals in time domain, frequency domain or space domain.

Advantages to be obtained in this specification are not limited to the aforementioned advantages, and those skilled in the art to which the present invention pertains may evidently understand other advantages from the following description.

DESCRIPTION OF DRAWINGS

FIG. 1 is a view illustrating an Evolved Packet System which is associated with the Long Term Evolution (LTE) system to which the present invention may be applied.

FIG. 2 illustrates a wireless communication system to which the present invention is applied.

FIG. 3 illustrates a functional split of an E-UTRAN and an EPC to which the present invention may be applied.

FIG. 4a is a diagram illustrating radio protocol architecture for a user plane.

FIG. 4b is a diagram illustrating radio protocol architecture for a control plane.

FIG. 5 illustrates MBMS definitions to which the present invention may be applied.

FIG. 6 illustrates an E-MBMS Logical Architecture to which the present invention may be applied.

FIG. 7 illustrates an eMBMS Architecture deployment alternatives to which the present invention may be applied.

FIG. 8 illustrates an overall u-plane architecture of the MBMS content synchronization to which the present invention may be applied.

FIG. 9 illustrates an E-MBMS c-plane architecture to which the present invention may be applied.

FIG. 10 illustrates change of MCCH Information to which the present invention may be applied.

FIG. 11 illustrates a communication path to which the present invention may be applied.

FIG. 12 shows the pictorial illustration of the scenario.

FIG. 13 shows an example of a plurality of control signals transmitted from eNBs of a cluster proposed in the present specification.

FIG. 14 is a diagram illustrating an example of receiving and processing a plurality of data in eNBs of a cluster proposed in the present specification.

FIG. 15 is a diagram illustrating an example of a method of encoding and transmitting two control signals differently proposed in the present specification.

FIG. 16 is a diagram illustrating an example of a method for transceiving signals in a wireless communication system supporting the zone-based communication proposed in the present specification.

FIG. 17 is a block diagram illustrating a wireless device in which methods as proposed herein may be implemented.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with a term, such as a "fixed station", a "base station (BS)", a "Node B", a "base transceiver system (BTS)", an "access point (AP)", a "macro eNB or master eNB (MeNB)" or a "secondary eNB (SeNB)." The term "UE" may be replaced with a term, such as a "terminal", a "mobile station (MS)", a "user terminal (UT)", a "mobile subscriber station (MSS)", a "subscriber station (SS)", a "station (STA)", an "advanced mobile station (AMS)", a "wireless terminal (WT)", a machine-type communication (MTC) device", a "machine-to-machine (M2M) device", a "device-to-device (D2D) device" or a wireless device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB. Specific terms used for the embodiments of the present invention are provided to aid in understanding of the present invention. These specific terms may be replaced with other terms within the scope and spirit of the present invention.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), LTE-Advanced Pro (LTE-A Pro), 5G New Radio (NR), and 3GPP2. Steps or parts that are not described to clarify the technical features of the present invention may be supported by those documents. Furthermore, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. LTE-A pro is an evolution of 3GPP LTE-A. 5G NR is a revolution of 3GPP LTE-A that will be implemented by OFDMA or its variants.

For the purposes of the present invention, the following abbreviations apply.
ACK Acknowledgement
AM Acknowledged Mode
AMBR Aggregate Maximum Bit Rate
ARQ Automatic Repeat Request
AS Access Stratum
BCCH Broadcast Control Channel
BCH Broadcast Channel
BM-SC Broadcast and. Multicast Service Center
BSR Buffer Status Report
CA Carrier Aggregation
CC Component Carrier
CG Cell Group
CMAS Commercial Mobile Alert Service
CP Cyclic Prefix
CoMP Coordinated Multi Point
C-plane Control Plane
C-RNTI Cell RNTI
CQI Channel Quality Indicator
CRC Cyclic Redundancy Check
CRS Cell-specific Reference Signal
DC Dual Connectivity
DCCH DCN Dedicated Core Network
DeNB Donor eNB
DL Downlink
DL SCH Downlink Shared CHannel
DRB Data Radio Bearer
DRX Discontinuous Reception
ECM EPS Connection Management
EMM EPS Mobility Management
eIMTA Enhanced Interference Management and Traffic Adaptation
eNB E-UTRAN NodeB
EMBMS Enhanced MBMS
EPC Evolved Packet Core
EPS Evolved Packet System
E-RAB E-UTRAN Radio Access Bearer
ETWS Earthquake and Tsunami Warning System
E-UTRA Evolved UTRA
E-UTRAN Evolved UTRAN
FDD Frequency Division Duplex
FDM Frequency Division Multiplexing
GERAN GSM EDGE Radio Access Network
GNSS Global Navigation Satellite System
GSM Global System for Mobile communication
GBR Guaranteed Bit Rate
GP Guard Period
G-RNTI Group RNTI
HARQ Hybrid ARQ
(H)eNB eNB or Home Enb
HFN Hyper Frame Number
HO Handover
HPLMN Home Public Land Mobile Network
HSDPA High Speed Downlink Packet Access
ID Identification or Identifier
IP Internet Protocol
LTE Long Term Evolution
LCID Logical Channel ID
MAC Medium Access Control
MBMS Multimedia Broadcast Multicast Service
MBMS GW MBMS Gateway
MBR Maximum Bit Rate
MBSFN Multimedia Broadcast multicast service Single Frequency Network
MCCH Multicast Control Channel
MCE Multi-cell/multicast Coordination Entity
MCG Master Cell Group
MCH Multicast Channel
MCS Modulation and Coding Scheme
MeNB Master eNB
MGW Media Gateway
MIB Master Information Block
MIMO Multiple Input Multiple Output
MME Mobility Management Entity
MRB MBMS Radio Bearer
M-RNTI MBMS RNTI
MSA MCH Subframe Allocation
MSI MCH Scheduling Information
MSP MCH Scheduling Period
MTCH Multicast Traffic Channel
MTC Machine-Type Communications
NACK Negative Acknowledgement
NAS Non-Access Stratum
OFDM Orthogonal Frequency Division Multiplexing
OFDMA Orthogonal Frequency Division Multiple Access
O&M Operations and Maintenances
P-GW PDN Gateway
PAPR Peak-to-Average Power Ratio
PCell Primary Cell
PDCCH Physical Downlink Control CHannel
PDCP Packet Data Convergence Protocol
PDN Packet Data Network
PDSCH Physical Downlink Shared CHannel
PDU Protocol Data Unit
PHY Physical layer
PLMN Public Land Mobile Network
ProSe Proximity based Services
PSCell Primary SCell
PUCCH Physical Uplink Control CHannel
PUSCH Physical Uplink Shared CHannel
PWS Public Warning System
QoS Quality of Service
RACH Random Access Channel
RB Radio Bearer
RF Radio Frequency
RLC Radio Link Control
RN Relay Node
RNC Radio Network Controller RNL Radio Network Layer
RNTI Radio Network Temporary Identifier
ROHC Robust Header Compression
RRC Radio Resource Control
RRM Radio Resource Management
S-GW Serving Gateway
S1-MME S1 for the control plane
SCC Secondary Component Carrier
SCell Secondary Cell
SCG Secondary Cell Group
SC-MCCH Single Cell Multicast Control Channel
SC-MTCH Single Cell Multicast Transport Channel
SeNB Secondary eNB
SI System Information
SIB System Information Block
S1-U S1 for the user plane
SAE System Architecture Evolution
SAP Service Access Point
SC-FDMA Single Carrier—Frequency Division Multiple Access
SC-PTM Single Cell Point To Multipoint
SCTP Stream Control Transmission Protocol
SDF SFN System Frame Number
SDU Service Data Unit
S-GW Serving GateWay
SRB Signalling Radio Bearer
TCP Transmission Control Protocol
TDD Time Division Duplex
TDM Time Division Multiplexing
TMGI Temporary Mobile Group Identity
TNL Transport Network Layer
TTI Transmission Time Interval
UE User Equipment
UL Uplink
UM Unacknowledged Mode
UMTS Universal Mobile Telecommunication System
U-plane User plane
UTRA Universal Terrestrial Radio Access
UTRAN Universal Terrestrial Radio Access Network
WLAN Wireless Local Area Network
X2 GW X2 GateWay
X2-C X2-Control plane
X2-U X2-User plane For the purposes of the present invention, the following terms and definitions apply.

Access Control: the process that checks whether a UE is allowed to access and to be granted services in a closed cell.

Carrier frequency: center frequency of the cell.

Cell: combination of downlink and optionally uplink resources. The linking between the carrier frequency of the downlink resources and the carrier frequency of the uplink resources is indicated in the system information transmitted on the downlink resources.

Cell Group: in dual connectivity, a group of serving cells associated with either the MeNB or the SeNB.

Dual Connectivity: mode of operation of a UE in RRC_CONNECTED, configured with a Master Cell Group and a Secondary Cell Group.

E-RAB: an E-RAB uniquely identifies the concatenation of an S1 Bearer and the corresponding Data Radio Bearer. When an E-RAB exists, there is a one-to-one mapping between this E-RAB and an EPS bearer of the Non Access Stratum as defined in [17].

Handover: procedure that changes the serving cell of a UE in RRC_CONNECTED.

Make-Before-Break HO/SeNB change: maintaining source eNB/SeNB connection after reception of RRC message for handover or change of SeNB before the initial uplink transmission to the target eNB during handover or change of SeNB.

Master Cell Group: in dual connectivity, a group of serving cells associated with the MeNB, comprising of the PCell and optionally one or more SCells.

Master eNB: in dual connectivity, the eNB which terminates at least S1-MME.

MBMS-dedicated cell: cell dedicated to MBMS transmission. MBMS-dedicated cell is not supported in this release.

MBMS/Unicast-mixed cell: cell supporting both unicast and MBMS transmissions.

MCG bearer: in dual connectivity, a bearer whose radio protocols are only located in the MeNB to use MeNB resources only.

Power saving mode: mode configured and controlled by NAS that allows the UE to reduce its power consumption.

ProSe UE-to-Network Relay: a UE that provides functionality to support connectivity to the network for Remote UE(s).

ProSe UE-to-Network Relay Selection: Process of identifying a potential ProSe UE-to Network Relay, which can be used for connectivity services (e.g. to communicate with a PDN).

ProSe UE-to-Network Relay Reselection: process of changing previously selected ProSe UE-to-Network Relay and identifying potential a new ProSe UE-to-Network Relay, which can be used for connectivity services (e.g. to communicate with PDN).

Public Safety ProSe Carrier: carrier frequency for public safety sidelink communication and public safety sidelink discovery.

Remote UE: a ProSe-enabled Public Safety UE, that communicates with a PDN via a ProSe UE-to-Network Relay.

SCG bearer: in dual connectivity, a bearer whose radio protocols are only located in the SeNB to use SeNB resources.

Secondary Cell Group: in dual connectivity, a group of serving cells associated with the SeNB, comprising of PSCell and optionally one or more SCells.

Secondary eNB: in dual connectivity, the eNB that is providing additional radio resources for the UE but is not the Master eNB.

Sidelink: UE to UE interface for sidelink communication, V2X sidelink communication and sidelink discovery.

Sidelink communication: AS functionality enabling ProSe Direct Communication, between two or more nearby UEs, using E-UTRA technology but not traversing any network node. In this version, the terminology "sidelink communication" without "V2X" prefix only concerns PS unless specifically stated otherwise.

Split bearer: in dual connectivity, a bearer whose radio protocols are located in both the MeNB and the SeNB to use both MeNB and SeNB resources.

FIG. 1 is a view illustrating an Evolved Packet System which is associated with the Long Term Evolution (LTE) system to which the present invention may be applied. The LTE system aims to provide seamless Internet Protocol (IP) connectivity between UE 10 and a pack data network (PDN), without any disruption to an end user's application during mobility. While the LTE system encompasses the evolution of the radio access through a Evolved Universal Terrestrial Radio Access Network (E-UTRAN) which defines radio protocol architecture between a user equipment and a BS 20, it is accompanied by the evolution of non-radio aspects under the term "System Architecture Evolution (SAE)" which includes an Evolved Packet Core (EPC) network. The LTE and SAE include an Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as a Core Network (CN), controls the UE and manages establishment of the bearers. As depicted in FIG. 1, the (logical or physical) node of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Furthermore, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Furthermore, it also holds information about the PDNs to which the user may connect. This may be in the form of an Access Point Name (APN), which is a label according to a Domain Name system (DNS) naming conventions describing the access point to the PDN, or a PDN Address which indicates subscribed IP addresses.

Various interfaces, such as an S1-U, S1-MME, S5/S8, S11, S6a, Gx, Rx and SGi, are defined between the EPS network elements shown in FIG. 1.

Hereinafter, the concept of Mobility Management (MM) and an MM back-off timer is explained in detail. The mobility management is a procedure to reduce the overhead in the E-UTRAN and processing in the UE. When the mobility management is performed, all UE-related information in the access network may be released during periods of data inactivity. This state may be referred to as EPS Connection Management IDLE (ECM-IDLE). The MME retains the UE context and the information about the established bearers during the idle periods.

To allow the network to contact UE in the ECM-IDLE, the UE updates the network as to its new location whenever it moves out of its current Tracking Area (TA). This procedure is called a "Tracking Area Update", and a similar procedure is also defined in a universal terrestrial radio access network (UTRAN) or GSM EDGE Radio Access Network (GERAN) system and is called a "Routing Area Update." The MME serves to keep track of the user location while the UE is in the ECM-IDLE state.

When there is a need to deliver downlink data to the UE in the ECM-IDLE state, the MME transmits the paging message to all BSs (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a "Service Request Procedure." UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer may be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one BS 20 which provides a control plane and a user plane to UE 10. The UE 10 may be fixed or mobile, and may be referred to as another terminology, such as an MS, a UT, an SS, an MT or a wireless device. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an Evolved Packet Core (EPC), more specifically, to an MME through S1-MME and to an S-GW through S1-U.

The EPC includes an MME, an S-GW, and a P-GW. The MME has access information of the UE or capability information of the UE, and such information is generally used for mobility management of the UE. The S-GW is a gateway having an E-UTRAN as an end point. The P-GW is a gateway having a PDN as an end point.

The layers of a radio interface protocol between the UE and the network may be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 illustrates a functional split of an E-UTRAN and an EPC to which the present invention may be applied.

Referring to the FIG. 3, the eNB may perform functions of selection for a gateway (e.g., an MME), routing toward the gateway during Radio Resource Control (RRC) activation, scheduling and transmitting of paging messages, scheduling and transmitting of broadcast channel (BCH) information, dynamic allocation of resources to the UEs in both uplink and downlink, configuration and provisioning of eNB measurements, radio bearer control, Radio Admission Control (RAC), and connection mobility control in LTE_ACTIVE state. In the EPC, and as mentioned above, the gateway may perform functions of paging origination, LTE_IDLE state management, ciphering of the user plane, System Architecture Evolution (SAE) bearer control, and ciphering and integrity protection of NAS signaling.

FIG. 4a is a diagram illustrating radio protocol architecture for a user plane. FIG. 4b is a diagram illustrating radio protocol architecture for a control plane. The user plane is a protocol stack for user data transmission. The control plane is a protocol stack for control signal transmission.

Referring to FIGS. 4a and 4b, a PHY layer provides an upper layer with an information transfer service through a physical channel. The PHY layer is connected to a Medium Access Control (MAC) layer which is an upper layer of the PHY layer through a transport channel. Data is transferred between the MAC layer and the PHY layer through the transport channel. The transport channel is classified according to how and with what characteristics data is transmitted through a radio interface.

Data is transferred through a physical channel between different PHY layers, that is, the PHY layer of a transmitter and the PHY layer of a receiver. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB may be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages may be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages. Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Furthermore, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, the RRC state and RRC connection of UE will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. In the RRC connected state, the UE has an RRC connection and thus the E-UTRAN may recognize a presence of the UE in a cell unit. Accordingly, the UE may be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

MBMS (Multimedia Broadcast Multicast Services)

For MBMS, the following definitions are introduced:

MBSFN Synchronization Area: an area of the network where all eNodeBs can be synchronized and perform MBSFN transmissions. MBSFN Synchronization Areas are capable of supporting one or more MBSFN Areas. On a given frequency layer, a eNodeB can only belong to one MBSFN Synchronization Area. MBSFN Synchronization Areas are independent from the definition of MBMS Service Areas MBSFN Transmission or a transmission in MBSFN mode: a simulcast transmission technique realised by transmission of identical waveforms at the same time from multiple cells. An MBSFN Transmission from multiple cells within the MBSFN Area is seen as a single transmission by a UE.

MBSFN Area: an MBSFN Area consists of a group of cells within an MBSFN Synchronization Area of a network, which are co-ordinated to achieve an MBSFN Transmission. Except for the MBSFN Area Reserved Cells, all cells within an MBSFN Area contribute to the MBSFN Transmission and advertise its availability. The UE may only need to consider a subset of the MBSFN areas that are configured, i.e. when it knows which MBSFN area applies for the service(s) it is interested to receive.

MBSFN Area Reserved Cell: A cell within a MBSFN Area which does not contribute to the MBSFN Transmission. The cell may be allowed to transmit for other services but at restricted power on the resource allocated for the MBSFN transmission.

Synchronisation Sequence: Each SYNC PDU contains a time stamp which indicates the start time of the synchronisation sequence. For an MBMS service, each synchronisation sequence has the same duration which is configured in the BM-SC and the MCE.

Synchronisation Period: The synchronisation period provides the time reference for the indication of the start time of each synchronisation sequence. The time stamp which is provided in each SYNC PDU is a relative value which refers to the start time of the synchronisation period. The duration of the synchronisation period is configurable.

FIG. 5 illustrates MBMS definitions to which the present invention may be applied.

In E-UTRAN, MBMS can be provided with single frequency network mode of operation (MBSFN) only on a frequency layer shared with non-MBMS services (set of cells supporting both unicast and MBMS transmissions i.e. set of "MBMS/Unicast-mixed cells").

MBMS reception is possible for UEs in RRC_CONNECTED or RRC_IDLE states. Whenever receiving MBMS services, a user shall be notified of an incoming call, and originating calls shall be possible. ROHC is not supported for MBMS.

RNs do not support MBMS.

FIG. 6 illustrates an E-MBMS Logical Architecture to which the present invention may be applied.

Multi-Cell/Multicast Coordination Entity (MCE)

The MCE is a logical entity—this does not preclude the possibility that it may be part of another network element—whose functions are:

the admission control and the allocation of the radio resources used by all eNBs in the MBSFN area for multi-cell MBMS transmissions using MBSFN operation. The MCE decides not to establish the radio bearer(s) of the new MBMS service(s) if the radio resources are not sufficient for the corresponding MBMS service(s) or may pre-empt radio resources from other radio bearer(s) of ongoing MBMS service(s) according to ARP. Besides allocation of the time/frequency radio resources this also includes deciding the further details of the radio configuration e.g. the modulation and coding scheme.

deciding on whether to use SC-PTM or MBSFN.

counting and acquisition of counting results for MBMS service(s).

resumption of MBMS session(s) within MBSFN area(s) based on e.g. the ARP and/or the counting results for the corresponding MBMS service(s).

suspension of MBMS session(s) within MBSFN area(s) based e.g. the ARP and/or on the counting results for the corresponding MBMS service(s).

The MCE is involved in MBMS Session Control Signalling. The MCE does not perform UE-MCE signalling.

An eNB is served by a single MCE.

E-MBMS Gateway (MBMS GW)

The MBMS GW is a logical entity—this does not preclude the possibility that it may be part of another network element—that is present between the BMSC and eNBs whose principal functions is the sending/broadcasting of MBMS packets to each eNB transmitting the service. The MBMS GW uses IP Multicast as the means of forwarding MBMS user data to the eNB. The MBMS GW performs MBMS Session Control Signalling (Session start/update/stop) towards the E-UTRAN via MME.

Control Plane Interfaces

"M3" Interface: MCE-MME

An Application Part is defined for this interface between MME and MCE. This application part allows for MBMS Session Control Signalling on E-RAB level (i.e. does not convey radio configuration data). The procedures comprise e.g. MBMS Session Start and Stop. SCTP is used as signalling transport i.e. Point-to-Point signalling is applied.

"M2" Interface: MCE-eNB

An Application Part is defined for this interface, which conveys at least radio configuration data for the multi-cell transmission mode eNBs and Session Control Signalling. SCTP is used as signalling transport i.e. Point-to-Point signalling is applied.

User Plane Interface

"M1" Interface: MBMS GW-eNB

This interface is a pure user plane interface. Consequently no Control Plane Application Part is defined for this interface. IP Multicast is used for point-to-multipoint delivery of user packets.

Deployment Consideration

The two envisaged alternatives are shown in FIG. 7.

The architecture on the right part is defined as the "distributed MCE architecture". In this architecture, a MCE is part of the eNB and the M2 interface should be kept between the MCE and the corresponding eNB.

The architecture on the left part is defined as the "centralized MCE architecture". In this architecture, the MCE is a logical entity which means it can be deployed as a stand-alone physical entity or collocated in another physical entity e.g. eNB. In both cases of the centralized MCE architecture, the M2 interface is kept between the MCE and all eNB(s) belonging to the corresponding MBSFN area.

FIG. 7 illustrates an eMBMS Architecture deployment alternatives to which the present invention may be applied.

E-MBMS User Plane Protocol Architecture

The overall U-plane architecture of content synchronization is shown in FIG. 8. This architecture is based on the functional allocation for Unicast and the SYNC protocol layer is defined additionally on transport network layer to support content synchronization mechanism.

FIG. 8 illustrates an overall u-plane architecture of the MBMS content synchronization to which the present invention may be applied.

The SYNC protocol is defined as a protocol to carry additional information that enable eNBs to identify the timing for radio frame transmission and detect packet loss. Every E-MBMS service uses its own SYNC entity. The SYNC protocol is applicable to DL and is terminated in the BM-SC.

E-MBMS Control Plane Protocol Architecture

The E-MBMS C-plane protocol architecture is shown in FIG. 9.

FIG. 9 illustrates an E-MBMS c-plane architecture to which the present invention may be applied.

MBMS Cells

MBMS/Unicast-Mixed Cell

In E-UTRAN, MBMS is only supported in a carrier shared with unicast traffic. Cells performing MBMS transmissions are referred to as MBMS/Unicast-mixed cells.

MBMS is not supported for HeNB.

For MBMS/Unicast mixed cells:

MTCH and MCCH are mapped on MCH for MBSFN transmission;

SC-MTCH and SC-MCCH are mapped on DL-SCH for SC-PTM transmission;

Transmission of both unicast and MBMS in the cell is done in a co-ordinated manner.

MBMS Transmission

Transmission of a MBMS in E-UTRAN uses either MBSFN transmission or SC-PTM transmission. The MCE makes the decision on whether to use SC-PTM or MBSFN for each MBMS session.

Single-Cell Transmission

Single-cell transmission of MBMS is characterized by:

MBMS is transmitted in the coverage of a single cell;

One SC-MCCH and one or more SC-MTCH(s) are mapped on DL-SCH;

Scheduling is done by the eNB;

SC-MCCH and SC-MTCH transmissions are each indicated by a logical channel specific RNTI on PDCCH (there is a one-to-one mapping between TMGI and G-RNTI used for the reception of the DL-SCH to which a SC-MTCH is mapped);

A single transmission is used for DL-SCH (i.e. neither blind HARQ repetitions nor RLC quick repeat) on which SC-MCCH or SC-MTCH is mapped;

SC-MCCH and SC-MTCH use the RLC-UM mode.

For each SC-MTCH, the following scheduling information is provided on SC-MCCH:

SC-MTCH scheduling cycle;

SC-MTCH on-duration: duration in downlink subframes that the UE waits for, after waking up from DRX, to receive PDCCHs. If the UE successfully decodes a PDCCH indicating the DL-SCH to which this SC-MTCH is mapped, the UE stays awake and starts the inactivity timer;

SC-MTCH inactivity-timer: duration in downlink subframes that the UE waits to successfully decode a PDCCH, from the last successful decoding of a PDCCH indicating the DL-SCH to which this SC-MTCH is mapped, failing which it re-enters DRX. The UE shall restart the inactivity timer following a single successful decoding of a PDCCH.

Multi-Cell Transmission

Multi-cell transmission of MBMS is characterized by:

Synchronous transmission of MBMS within its MBSFN Area;

Combining of MBMS transmission from multiple cells is supported;

Scheduling of each MCH is done by the MCE;

A single transmission is used for MCH (i.e. neither blind HARQ repetitions nor RLC quick repeat);

A single Transport Block is used per TTI for MCH transmission, that TB uses all the MBSFN resources in that subframe;

MTCH and MCCH can be multiplexed on the same MCH and are mapped on MCH for p-t-m transmission;

MTCH and MCCH use the RLC-UM mode;

The MAC subheader indicates the LCID for MTCH and MCCH;

The MBSFN Synchronization Area, the MBSFN Area, and the MBSFN cells are semi-statically configured e.g. by O&M;

MBSFN areas are static, unless changed by O&M (i.e. no dynamic change of areas);

Multiple MBMS services can be mapped to the same MCH and one MCH contains data belonging to only one MBSFN Area. An MBSFN Area contains one or more MCHs. An MCH specific MCS is used for all subframes of the MCH that do not use the MCS indicated in BCCH. All MCHs have the same coverage area.

For MCCH and MTCH, the UE shall not perform RLC re-establishment at cell change between cells of the same MBSFN area. Within the MBSFN subframes, all MCHs within the same MBSFN area occupy a pattern of subframes, not necessarily adjacent in time, that is common for all these MCHs and is therefore called the Common Subframe Allocation (CSA) Pattern. The CSA pattern is periodically repeated with the CSA period. The actual MCH subframe allocation (MSA) for every MCH carrying MTCH is defined by the CSA pattern, the CSA period, and the MSA end, that are all signalled on MCCH. The MSA end indicates the last subframe of the MCH within the CSA period. Consequently, the MCHs are time multiplexed within the CSA period, which finally defines the interleaving degree between the MCHs. It shall be possible for MCHs to not use all MBSFN resources signalled as part of the Rel-8 MBSFN signalling. Further, such MBSFN resource can be shared for more than one purpose (MBMS, Positioning, etc.). During one MCH scheduling period (MSP), which is configurable per MCH, the eNB applies MAC multiplexing of different MTCHs and optionally MCCH to be transmitted on this MCH.

MCH scheduling information (MSI) is provided per MCH to indicate which subframes are used by each MTCH during the MSP, and to indicate whether transmission for an MTCH is going to be, or has been, suspended by the eNode B. The following principles are used for the MSI:

it is used both when services are multiplexed onto the MCH and when only a single service is transmitted on the MCH;

it is generated by the eNB and provided once at the beginning of the MSP;

it has higher scheduling priority than the MCCH and, when needed, it appears first in the PDU;

it allows the receiver to determine what subframes are used by every MTCH, sessions are scheduled in the order in which they are included in the MCCH session list;

it is carried in a MAC control element which cannot be segmented;

it carries the mapping of MTCHs to the subframes of the associated MSP. This mapping is based on the indexing of subframes belonging to one MSP;

it carries an indication of whether the transmission of an MTCH is to be suspended by the eNode B.

The content synchronization for multi-cell transmission is provided by the following principles:

1. All eNBs in a given MBSFN Synchronization Area have a synchronized radio frame timing such that the radio frames are transmitted at the same time and have the same SFN.

2. All eNBs have the same configuration of RLC/MAC/PHY for each MBMS service, and identical information (e.g. time information, transmission order/priority information) such that synchronized MCH scheduling in the eNBs is ensured. These are indicated in advance by the MCE.

3. An E-MBMS GW sends/broadcasts MBMS packet with the SYNC protocol to each eNB transmitting the service.

4. The SYNC protocol provides additional information so that the eNBs identify the transmission radio frame(s). The E-MBMS GW does not need accurate knowledge of radio resource allocation in terms of exact time division (e.g. exact start time of the radio frame transmission).

5. eNB buffers MBMS packet and waits for the transmission timing indicated in the SYNC protocol.

6. The segmentation/concatenation is needed for MBMS packets and should be totally up to the RLC/MAC layer in eNB.

7. The SYNC protocol provides means to detect packet loss(es) and supports a recovery mechanism robust against loss of consecutive PDU packets (MBMS Packets with SYNC Header).

8. For the packet loss case the transmission of radio blocks potentially impacted by the lost packet should be muted.

9. The mechanism supports indication or detection of MBMS data burst termination (e.g. to identify and alternately use available spare resources related to pauses in the MBMS PDU data flow).

10. If two or more consecutive SYNC SDUs within a SYNC bearer are not received by the eNB, or if no SYNC PDUs of Type 0 or 3 are received for some synchronization sequence, the eNB may mute the exact subframes impacted by lost SYNC PDUs using information provided by SYNC protocol. If not muting only those exact subframes, the eNB stops transmitting the associated MCH from the subframe corresponding to the consecutive losses until the end of the corresponding MSP and it does not transmit in the subframe corresponding to the MSI of that MSP.

11. The eNB sets VT(US) to zero in the RLC UM entity corresponding to an MCCH at its modification period boundary.

12. The eNB sets VT(US) to zero in each RLC UM entity corresponding to an MTCH at the beginning of its MSP.

13. The eNB sets every bit in the MAC padding on MCH to "0".

14. The eNB's RLC concatenates as many RLC SDUs from the same radio bearer as possible.

15. The eNB's MAC multiplexes as many RLC PDUs as fit in the Transport Block.

16. The eNB sets every padding bit in the RLC UM PDU corresponding to an MTCH or MCCH to "0".

17. A MAC PDU including a MAC subheader for a MTCH MAC SDU always includes non-zero size of MTCH MAC SDU.

18. A MAC PDU including a MAC subheader for a MSI MAC control element always includes non-zero size of MSI MAC control element.

UEs that are receiving MTCH and/or SC-MTCH transmissions can be in RRC_IDLE or RRC_CONNECTED state.

The following principles govern the MCCH structure:

One MBSFN Area is associated with one MCCH and one MCCH corresponds to one MBSFN Area;

The MCCH is sent on MCH;

MCCH consists of a single MBSFN Area configuration RRC message which lists all the MBMS services with ongoing sessions and an optional MBMS counting request message which, when present, comes after the former message in the repetition period;

MCCH is transmitted by all cells within an MBSFN Area, except the MBSFN Area Reserved Cells;

MCCH is transmitted by RRC every MCCH repetition period;

MCCH uses a modification period;

A notification mechanism is used to announce changes of MCCH due to either Session Start or the presence of an MBMS counting request message;

The notification is sent periodically throughout the modification period preceding the change of MCCH, in MBSFN subframes configured for notification;

The DCI format 1C with M-RNTI is used for notification and includes an 8-bit bitmap to indicate the one or more MBSFN Area(s) in which the MCCH change(s);

The UE monitors more than one notification subframe per modification period;

When the UE receives a notification, it acquires the MCCH at the next modification period boundary;

The UE detects changes to MCCH which are not announced by the notification mechanism by MCCH monitoring at the modification period.

The following principles govern the SC-MCCH structure:

there is one SC-MCCH per cell;

the SC-MCCH is sent on DL-SCH;

the SC-MCCH provides the list of all MBMS services with ongoing sessions transmitted on SC-MTCH(s), including for each MBMS service TMGI and optional session ID, associated G-RNTI and scheduling information;

SC-MCCH is transmitted by RRC every SC-MCCH repetition period;

SC-MCCH uses a modification period;

A notification mechanism is used to announce changes of SC-MCCH due to Session Start:

The notification is sent in the first subframe in a repetition period where the SC-MCCH can be scheduled. The notification is sent using the DCI format 1C with SC-N-RNTI and one bit within the 8-bit bitmap;

When the UE receives a notification, it acquires the SC-MCCH in the same subframe;

The UE detects changes to SC-MCCH which are not announced by the notification mechanism by SC-MCCH monitoring at the modification period.

MBMS Signalling on BCCH

BCCH only points to the resources where the MCCH(s)/SC-MCCH can be found i.e. it does not indicate the availability of the services;

For each MCCH, BCCH indicates independently:

the scheduling of the MCCH for multi-cell transmission on MCH;

the MCCH modification period, repetition period radio frame offset and subframe allocation;

an MCS which applies to the subframes indicated for MCCH scheduling and for the first subframe of all MSPs in that MBSFN Area.

For the notification commonly used for all MCCH, BCCH:

configures the position of the MCCH change notification subframe and the number of occasions monitored by the UE;

indicates the mapping between the PDCCH bit(s) carried in the notification and the MCCH(s).

BCCH indicates the SC-MCCH modification period, SC-MCCH repetition period and SC-MCCH subframe offset.

MBMS General

In general the control information relevant only for UEs supporting MBMS is separated as much as possible from unicast control information. Most of the MBMS control information is provided on a logical channel specific for MBMS common control information: the MCCH. E-UTRA employs one MCCH logical channel per MBSFN area. In case the network configures multiple MBSFN areas, the UE acquires the MBMS control information from the MCCHs that are configured to identify if services it is interested to receive are ongoing. The action applicable when the UE is unable to simultaneously receive MBMS and unicast services is up to UE implementation. In this release of the specification, an MBMS capable UE is only required to support reception of a single MBMS service at a time, and reception of more than one MBMS service (also possibly on more than one MBSFN area) in parallel is left for UE implementation. The MCCH carries the MBSFNAreaConfiguration message, which indicates the MBMS sessions that are ongoing as well as the (corresponding) radio resource configuration. The MCCH may also carry the MBMSCountingRequest message, when E-UTRAN wishes to count the number of UEs in RRC_CONNECTED that are receiving or interested to receive one or more specific MBMS services.

A limited amount of MBMS control information is provided on the BCCH. This primarily concerns the information needed to acquire the MCCH(s). This information is carried by means of a single MBMS specific SystemInformationBlock: SystemInformationBlockType13. An MBSFN area is identified solely by the mbsfn-AreaId in SystemInformationBlockType13. At mobility, the UE considers that the MBSFN area is continuous when the source cell and the target cell broadcast the same value in the mbsfn-AreaId.

Scheduling

The MCCH information is transmitted periodically, using a configurable repetition period. Scheduling information is not provided for MCCH i.e. both the time domain scheduling as well as the lower layer configuration are semi-statically configured, as defined within System IInformationBlockType13.

For MBMS user data, which is carried by the MTCH logical channel, E-UTRAN periodically provides MCH scheduling information (MSI) at lower layers (MAC). This MCH information only concerns the time domain scheduling i.e. the frequency domain scheduling and the lower layer configuration are semi-statically configured. The periodicity of the MSI is configurable and defined by the MCH scheduling period.

MCCH Information Validity and Notification of Changes

Change of MCCH information only occurs at specific radio frames, i.e. the concept of a modification period is used. Within a modification period, the same MCCH information may be transmitted a number of times, as defined by its scheduling (which is based on a repetition period). The modification period boundaries are defined by SFN values for which SFN mod m=0, where m is the number of radio frames comprising the modification period. The modification period is configured by means of SystemInformationBlockType13.

When the network changes (some of) the MCCH information, it notifies the UEs about the change during a first modification period. In the next modification period, the network transmits the updated MCCH information. These general principles are illustrated in FIG. 10, in which different colours indicate different MCCH information. Upon receiving a change notification, a UE interested to receive MBMS services acquires the new MCCH information immediately from the start of the next modification period. The UE applies the previously acquired MCCH information until the UE acquires the new MCCH information.

FIG. 10 illustrates change of MCCH Information to which the present invention may be applied.

Indication of an MBMS specific RNTI, the M-RNTI, on PDCCH is used to inform UEs in RRC_IDLE and UEs in RRC_CONNECTED about an MCCH information change. When receiving an MCCH information change notification, the UE knows that the MCCH information will change at the next modification period boundary. The notification on PDCCH indicates which of the MCCHs will change, which is done by means of an 8-bit bitmap. Within this bitmap, the bit at the position indicated by the field notificationIndicator is used to indicate changes for that MBSFN area: if the bit is set to "1", the corresponding MCCH will change. No further details are provided e.g. regarding which MCCH information will change. The MCCH information change notification is used to inform the UE about a change of MCCH information upon session start or about the start of MBMS counting.

The MCCH information change notifications on PDCCH are transmitted periodically and are carried on MBSFN subframes only. These MCCH information change notification occasions are common for all MCCHs that are configured, and configurable by parameters included in SystemInformationBlockType13: a repetition coefficient, a radio frame offset and a subframe index. These common notification occasions are based on the MCCH with the shortest modification period.

A UE that is receiving an MBMS service via MRB shall acquire the MCCH information from the start of each modification period. A UE interested to receive MBMS from a carrier on which dl-Bandwidth included in MasterInformationBlock is set to n6 shall acquire the MCCH information at least once every MCCH modification period. A UE that is not receiving an MBMS service via MRB, as well as UEs that are receiving an MBMS service via MRB but potentially interested to receive other services not started yet in another MBSFN area from a carrier on which dl-Bandwidth included in MasterInformationBlock is other than n6, shall verify that the stored MCCH information remains valid by attempting to find the MCCH information change notification at least notificationRepetitionCoeff times during the modification period of the applicable MCCH(s), if no MCCH information change notification is received.

Connectivity for Drones

The objective is to provide use cases concerning connection of drones.

Use cases can be:

Phil is a farm worker who has 55 hectares planted with sensitive cultures. He wants to survey, in real time, the fields and the state of the crops. He uses a drone and a remote control that are both connected to the mobile network. Due to low latency, Phil is able to control the drone and is also able to analyze it, in real time, the video and infrared imaging of the fields that are streamed from the cameras and sensors. This provides all necessary information for decision making on irrigation, fertilizer and pesticide distribution Jack works for a TV station as a cameraman. He or she uses a drone to live broadcast outdoor events like marathon, F1 auto racing. High quality live video (e.g. Full HD, 4K) is transmitted from the flying drone to the TV station via the mobile network.

In many scenarios, the drone flies in low altitude. The drone needs to maintain continuous connection with the mobile network which requires the network supports continuous wireless coverage in low altitude flight scenarios.

A drone and remote control are connected to the mobile network.

The drone is piloted with remote mode, data being transmitted via the network.

The drone transmits video and with other data, such as infrared pictures.

FIG. 11 illustrates a communication path to which the present invention may be applied.

Specifically, FIG. 11 depicts how communication will occur, in this use case communication occurs through the mobile network (wide area network (WAN)).

Communication does not occur node to node or through a wireless controller (local area network (LAN))

Potential Service Requirements

The 3GPP system shall be able, in the context of Internet of Things, to provide best solutions for applications using, for example drones or robotics. All requirements are for end to end performance, defined as communications sent by source and communication received by target.

The 3GPP system shall support:
Round trip latency less than [150 ms], including all network components.
Due to consequences of failure being loss of property or life, reliability goal is [near 100%.]
Reliability to be at the same level for current aviation Air Traffic Control (ATC). Link supports command and control of vehicles in controlled airspace.
Priority, Precedence, Preemption (PPP) mechanisms shall be used to ensure sufficient reliability metrics are reached.
Position accuracy within [10 cm] to avoid damage to property or life in densely populated areas.
Provide continuous wireless coverage, high speed uplink bandwidth at least [20 Mbps], for a flying UE at low altitude of [10-1000] meters with the high speed as maximum as [300 km/h].

Utilization of the drones is started to find many new uses in enhancing our way of life such as on-demand package delivery, traffic control and surveillance, search and rescue, wild life surveillance, agriculture, cinematography, etc. Since the cellular networks are almost ubiquitously present, the control and data communications from/to drones using the cellular networks seems legitimate choice and, as the matter of fact, much research efforts are devoted to it.

Cellular networks are fundamentally designed to support the terrestrial-based communications. The communications from/to drones require the management and connection establishment over the sky.

Hence, design approach to support drone communications using the cellular networks are reconsidered and modified. Especially, terrestrial-based handover algorithm and mechanism will be reconsidered. In this invention, we identify the possible environmental difference present in conventional and drone communications, and propose the handover methods that will provide a reduced signaling burden to the cellular networks.

In 3GPP, drone-based communications are considered one of the use cases in 5G communications.

Especially, it considers the operation of and communications with the drones up to 1000 meters. In this scenario, there will be a high chance for the drone to detect the signals from more than one eNB.

Another application of the drone that major companies like Amazon considers is on-demand package delivery in metropolitan areas. In this scenario, the drone will see many pico-cells deployed over the metropolitan area.

FIG. 12 shows the pictorial illustration of the scenario. The communication links between the drone and many eNBs will be line-of-sight (LOS) most of the time, and thus the difference in signal strength may not be noticeable as in the terrestrial-based cellular communications.

If the conventional handover method and algorithm based on the pre-determined threshold are applied, some problems can be incurred:
frequent handover may be observed
signaling overhead may be increased due to frequent handover attempts In this invention, we consider efficient handover method and algorithms, for UE(s) in RRC_Connected mode (but not limited to RRC_Connected mode), that will reduce the signalling overhead.

Both UE (drone)-initiated and network-initiated, but network-controlled handover are considered.

From now on, UE will imply the drone if the special interpretation is missing.

FIG. 12 shows the scenario of operation considered in this invention in which UE sees transmission from multiple eNBs.

That is, FIG. 12 is a schematic diagram of a cellular-based drone communication system to which a method proposed in this specification may be applied.

As shown in FIG. 12, from a standpoint of a drone, cell coverage is greater than cell coverage when UE is placed on the ground.

That is, if UE is an object in the air, cell coverage of the UE is increased.

In this case, an influence attributable to an impact on a cell is greatly reduced because a random variance in the cell coverage is reduced.

Furthermore, from a standpoint of the drone, cell coverage may be provided by a single eNB, but may be provided through a plurality of eNBs.

Furthermore, in the case of an environment in which many small cells, such as pico cells and micro cells, are deployed, from a standpoint of a drone, a plurality of small cells may look overlapped.

Hereinafter, a method for transmitting and receiving reliably a control signal and/or data between at least one base station and a drone proposed in the present specification will be described in detail.

As used herein, 'A and/or B' may be interpreted to have the same meaning as 'at least one of A or B.'

In the present specification, for convenience of explanation, a 'drone' will be described as an example of a UE.

However, the methods proposed herein are not limited to drones, and may be applied to all devices that may be represented by a terminal.

Also, the methods proposed in the present specification may be applied to MBMS related description described prior to the methods in terms of simultaneously transmitting signals.

Utilization of the unmanned aerial vehicles (UAVs), drones, is started to find many new uses in enhancing our way of life such as on-demand package delivery, traffic control and surveillance, search and rescue, wild life surveillance, agriculture, cinematography, etc.

Recently manned aerial vehicles (MAVs) is also started to draw much attention with possible application of transportation. Since the cellular networks are almost ubiquitously present, the control and data communications from/to drones using the cellular networks seems legitimate choice and, as the matter of fact, much research efforts are devoted to it.

Reliability requirements on the drones are far more stringent to the most of the applications due to expected disastrous incidents, it is necessary to consider the redesign and/or modification of the existing cellular networks' operation since they are fundamentally designed to support the terrestrial-based communications.

Especially, terrestrial-based management and control will be reconsidered to meet the reliability requirement.

In this invention, we identify the possible environmental difference present in conventional and drone communications, and propose the method to transmit/receive the control and data signals to/from the drones.

In 3GPP, drone-based communications are considered one of the use cases in 5G communications.

Especially, it considers the operation of and communications with the drones up to 1000 meters. In this scenario, there will be a high chance for the drone to detect the signals from more than one eNB.

Another application of the drone that major companies like Amazon considers is on-demand package delivery in metropolitan areas. In this scenario, the drone will see many pico-cells deployed over the metropolitan area.

FIG. 13 shows the pictorial illustration of the scenario. The communication links between the drone and many eNBs will be line-of-sight (LOS) most of the time, and thus the difference in signal strength may not be noticeable as in the terrestrial-based cellular communications. eNB can be considered as a cell if the cell is the basic infrastructure unit in handling the drone operation.

If the conventional approach employed in LTE and LTE-Advanced in transmitting the control signals for which an eNB is responsible, reliability requirements imposed on the drone operation will not be met.

In this invention, we consider the reliable drone operation by multiple eNBs' coordinated transmissions and receptions of control signal and/or data.

That is, the present disclosure provides a method for transmitting and receiving (or transceiving) control signals and/or data between the drones and the eNB(s) in a zone-based manner.

The (geographical) zone(s) as defined (or used) herein may refer to a set of geographically preconfigured eNBs by the Mobile Network Operator (MNO).

That is, geographical zones can be configured by the eNB or pre-configured.

When zones are configured, the world is divided into geographical zones using a single fixed reference point (i.e. geographical coordinates (0, 0)), length and width.

The drone can determine the zone identity by means of modulo operation using length and width of each zone, number of zones in length, number of zones in width and the single fixed reference point.

Also, the zone may be considered as a set of eNBs controlled by a central virtual baseband pool envisaged in a Cloud Radio Access (C-RAN) Network.

In addition, the concept of the zone may be interpreted in the same manner as the concept of the zone used in Coordinated Multi-Point transmission and reception (CoMP).

It is assumed that centralized resource management may be performed on the zone.

A cluster for a drone in a zone is defined as a subset of zones (e.g., a subset of eNBs taken from the zone).

One or more eNB (s) included in the cluster may transmit a plurality of control signals to the drones so that the drones may combine the control signals.

This allows the drones to receive a reliable signal from the eNB (s).

Also, when one or more eNB (s) in the cluster transmit a plurality of control signals to the drones, a plurality of control signals transmitted to the drones may be transmitted repeatedly in sequence of each base station, or may be repeatedly transmitted by each base station.

Also, for a plurality of control signals transmitted to the drone, its sequence or number of transmissions of each base station may be determined based on the speed, the trajectory information, and the like of the drone, which may be performed by a central resource controller.

In the present specification, a state of the drone may be an idle state or a connected state, but it is assumed that the state of the drone is a connected state unless otherwise specified.

Also, the same or different clusters may be allocated to the drone, respectively.

A central resource controller (e.g., a scheduler) may determine how many and which eNB(s) in the cluster are involved in transmitting and receiving with the drones, and may transmit the determined results to the drone or eNB(s).

Transmission to the drones may be determined based on information on quality received from the eNB(s) in the cluster (e.g., signal-to-interference-plus-noise ratio (SINR), signal-to-noise ratio (SNR)) and resource availability (e.g. traffic load condition) from the eNB(s) in the cluster obtained by the central resource controller The number of eNBs associated with transmission to the drones or the number of eNBs associated with reception of drones may be different from each other.

For example, if a performance requirement is satisfied through one transmission and two receptions with appropriate signal processing, then the central controller may be able to select only one eNB in the cluster for the transmission to the drone and two eNBs for the reception from the drone.

The control signals transmitted to the drone from the plurality of eNBs of the cluster may be the same or different. When the same eNB signals are transmitted from the plurality of eNBs and the drone combines signals transmitted from the plurality of eNBs, signal integrity is improved due to an increased SINR or SNR.

In another embodiment, the same control content may be encoded differently through the plurality of eNBs. Signal integrity may be improved due to an increased coding gain when the drone combines signals transmitted differentially encoded and decodes the combined signal.

Additionally, data transmitted from the drone to the eNBs may be processed at the plurality of eNBs in the cluster.

As an example, an eNB experiencing the best reception quality among the plurality of eNBs may be selected to process data transmitted from the drones.

In yet another embodiment, signals received at the plurality of eNBs may be combined.

FIG. 13 illustrates an example of a plurality of control signals transmitted from eNBs in the cluster proposed in the present specification.

FIG. 14 is a diagram illustrating an example of receiving and processing a plurality of data at eNBs in the cluster proposed in the present specification.

Next, a method of transmitting and receiving control signals and/or data between the drone and the eNBs proposed in the present specification will be described in more detail.

First, a terrestrial area is divided into a plurality of zones for supporting the drone and communicating with the drone.

The zone may be configured as a set of eNBs, as previously discussed, and a configuration for a corresponding zone may be performed by the MNO.

One of the advantages of zone-based approach is that it may reduce a signaling between eNBs for transmitting communications from the eNB to another eNB.

The central resource controller may configure the cluster for the drone based on a feedback from the drone. The cluster may be a subset of the zone.

The feedback may consist of a list of eNBs that may be detected by the drone and corresponding signal qualities.

The central resource controller determines which eNB transmits the control signal to meet performance requirements.

The number of selected eNBs may be configured according to interference experienced by the drone, performance requirements of the control signal for the drone, and so on.

The central resource controller may notify the drone of its choice as control information or data.

The control signal may be transmitted using orthogonal frequency division multiple access (OFDMA), single-carrier frequency division multiple access (SC-FDMA), or a variant thereof.

The duration of a cyclic prefix (CP) in OFDM, OFDMA, SC-FDMA, or their variants can be predetermined based on an altitude of the drone.

For example, a short CP (or first CP) may be used for a drone at a low altitude, an intermediate CP (or second CP) may be used at a medium altitude, and a long CP (or third CP) may be used at a high altitude, respectively.

The number of configurable eNBs in the cluster may be scheduled to be transmittable the control signal (in the sky) to the drones.

The control signals of each eNB may be encoded the same as or different from the same control contents FIG. 15 is a diagram illustrating an example of a method of encoding and transmitting two control signals differently proposed in the present specification.

Referring to FIG. 15, it may be seen that one control message 1510 is inputted into different encoders (a first constituent encoder 1520 and a second constituent encoder 1530), encoded, and then transmitted through different base stations.

Here, it may be seen that a signal inputted to the second constituent encoder is to interleave a signal inputted to the first constituent encoder through the interleaver 1560.

Here, it may be seen that the control signals transmitted through each base station are different from each other (a first control signal 1540, a second control signal 1550).

The encoding process may be extended to the plurality of eNBs.

Further, it is assumed that a systematic Turbo coding is applied, and other channel coding schemes such as low density parity check (LDPC) code, polar code, and convolutional code may also be applied.

The control signal transmitted from each eNB may be spread orthogonally or pseudo-orthogonally prior to transmission of the control signal to obtain an advantage of LOS transmission.

Also, when the drone is located among zones, overlapped eNBs may repeatedly transmit the control signal to the drone.

Data transmission from the drone to the eNBs in the cluster may be jointly processed. That is, the eNBs may combine and process a plurality of received signals.

The data signal received by a particular eNB indicating the best received signal quality may be selected.

The data signals received by the eNBs in the cluster may be jointly processed. An example of processing includes maximal ratio combining, maximum-likelihood (ML) processing, and the like. A subset may include all eNBs in the cluster.

The number of eNBs associated with data reception and processing of the drone may be varied depending on interference, performance requirements, and the like.

In the present invention, it is assumed that the central controller controls transmission and reception of control signals and data for the drone. However, the same objective may be achieved through a distributed controller located at the serving base station.

The serving base station may implement the concept of a cluster described in the present invention based on information received from the drones (e.g., a list of eNBs and the corresponding signal quality).

Depending on the decision to meet requirements, the serving eNB may be connected to the eNB to be included in the cluster and control transmission and reception via interfaces (e.g., X2 interfaces of LTE and LTE-Advanced or variants thereof).

In the present invention, it is assumed that the drone is in the intra-zone.

Also, the drone may be located in the inter-zone area capable of sensing pilot signals from other zones.

The central controller identifies uncontrollable eNBs and thus it may know that the drone is in the inter-zone. In this case, the following procedures may be performed.

1. More eNBs may be allocated to be capable of transmitting and receiving control signals and data. This may provide a spatial diversity gain.

2. Each of a plurality of transmissions and/or signals for the same control signal and/or data from/to given eNBs may be performed to obtain a time and/or frequency diversity gain.

3. More redundant information may be added to the control signal and/or data to provide additional coding gain to overcome interference from other zones.

4. Joint coordinated scheduling may be performed between zones in a manner that may be instructed to allocate resources used in the current zone, so that the eNBs in an interference zone are not interrupted with the transmission to the drones.

Existing interfaces or new interfaces may be used for the inter-zone communication. The central controller that manages the eNBs with which the drone communicates is responsible for the aforementioned operations, which may be referred to as the "serving central controller".

FIG. 16 is a diagram illustrating an example of a method of transmitting and receiving signals in a wireless communication system supporting the zone-based communication proposed in the present specification.

First, the drones receive a plurality of control signals from one or more base stations included in at least one cluster (S 1610).

Here, the at least one cluster is included in a zone defined by a predetermined set of base stations for the drone.

Further, the plurality of control signals includes the same control contents, and is repeatedly transmitted by the base stations.

Further, the plurality of control signals is sequentially transmitted by each of the base stations.

In this case, a sequence with which each of the control signals is transmitted may be determined by at least one of a speed of the drone or trajectory information of the drone.

Further, the plurality of control signals may include at least one of an identifier of the at least one cluster or an identifier of the zone.

Here, the number of base stations which transmits the plurality of control signals may be determined by a central resource controller or a serving base station, and the serving base station corresponds to any one base station of the base stations.

The number of base stations which transmits the plurality of control signals may be determined based on at least one of signal quality of a drone, a speed of the drone, or trajectory information of the drone which is received from the base stations included in the at least one cluster.

Further, the specific operation may be an operation for hovering the drones or an operation for safely landing the drones in emergency, The plurality of control signals are modulated by using any one of OFDM (Orthogonal Frequency Division Multiplexing) scheme, OFDMA (Orthogonal Frequency Division Multiple Access) scheme, CDMA scheme, SDMA or SC-FDMA (Single-Carrier Frequency Division Multiple Access) scheme.

Duration of a cyclic prefix (CP) or a subcarrier spacing used in the plurality of control signals is categorized with a plurality of factors based on a specific factor influencing channel characteristics.

The specific factor includes at least one of an altitude of the drone, a speed of the drone, or weather information.

The duration of the CP used in the plurality of control signals is categorized with a first CP, a second CP, and a third CP based on the altitude of the drone, and the first CP may be used at a low altitude and the second CP may be used at a medium altitude, and the third CP may be used at a high altitude.

Here, the first CP, the second CP and the third CP are types of the CP.

Hereinafter, a CP length (or a CP duration) and the subcarrier spacing used for a signal transceived between the drone and the base station will be described in more detail.

First, the CP length of the signal is determined according to at least one of an altitude of the drone, whether it is a line-of-sight (LOS) between the drone and the base station, or whether there is an obstacle (e.g., heavy reflector) between the drone and the base station.

The reason for this is that the (OFDM) CP length is determined according to propagation delay (or delay spread), and parameters (the altitude of the drone, etc.) affect the propagation delay.

It is assumed that the altitude at which the drone can operate is up to 1 km (1,000 m). However, as an example, the drone may operate at 1 km or more.

When the distance between the drone and the base station is LOS, a Normal CP or a Short CP may be used.

In general, the distance between the drone and the base station can be regarded as LOS. However, if the base station is located in a forest or between buildings in a city, LOS may not be guaranteed between the drone and the base station.

Therefore, it is necessary to consider the case where the CP length of the signal is NLOS (Non-Line-Of-Sight) between the drone and the base station.

If the distance between the drone and the base station is NLOS, the CP length of the signal can be distinguished based on the altitude of the drone.

For example, if the distance between the drone and the base station is NLOS, (1) the normal CP can be used up to a certain altitude of the drone (e.g., 500 m), (2) if the altitude of the drone is above the certain altitude (e.g., from 500 m to 1,000 m), the Extend CP can be used.

That is, if the LOS between the drone and the base station is not guaranteed, the Extended CP is preferably used.

Here, the Normal CP and the Extended CP represent a Normal CP and an Extended CP defined in LTE, respectively.

A CP length ($T_{cp}$) of the normal CP is $160*T_s$ in the first OFDM symbol of a slot and $144*T_s$ in the remaining OFDM symbols of the slot.

Also, a CP duration ($T_{cp}$) in the Extended CP is $512*T_s$ in all OFDM symbols in the slot.

Here, the $T_s$ represents a time unit which is a reference of a size of various fields in the time domain, and $T_s=1/(15000*2048)$ sec.

Also, the (OFDM) subcarrier spacing of the signal used in the method may be determined according to the speed of the drone.

The reason for this is that the (OFDM) subcarrier spacing is related to Doppler spread, and the Doppler spread is related to a speed of an object performing communication and a wavelength of a signal used for the communication.

Here, the object to perform the communication may be a drone, and the signal used for the communication is the signal transmitted/received between the drone and the base station.

A subcarrier spacing (7.5 kHz, 15 KHz, . . . ) used in LTE supports 500 km/h, so the subcarrier spacing used in LTE can be used when the speed of the drone is 500 km/h or less.

However, when the speed of the drone is 500 km/h or higher, other subcarrier spacing may be used.

In the case of 5G (New Rat, NR), a subcarrier spacing and a cyclic prefix are used as shown in the following Table 1, and the CP or the subcarrier Spacing used for the signal of the method can use any one of them.

TABLE 1

| $\mu$ | $\Delta f = 2\mu * 15(kHZ)$ | Cyclic Prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Table 1 shows an example of OFDM numerologies supported in New Rat (NR).

The contents of the above can be summarized as shown in the following table 2.

TABLE 2

| | Subcarrier spacing | Cyclic Prefix |
|---|---|---|
| Distance between the drone and the base station is LOS | Normal, Small | Normal, Short |
| Distance between the drone and the base station is NLOS | Normal | Normal(up to certain altitude(e.g., 500 m)), Extended(beyond certain altitude(e.g., 500~1000 m)) |
| If the distance between the drone and the base station is NLOS, and there is a heavy reflector between the drone and the base station | Normal | Extended |

In table 2, the normal subcarrier spacing and the normal CP mean the subcarrier spacing and the normal CP used in LTE, respectively.

Further, the plurality of control signals is orthogonally or pseudo-orthogonally spread.

The zone may be an intra-zone or an inter-zone

Further, the number of base stations determined by the central resource controller is greater in the inter-zone than in the intra-zone Then, the drone combines the plurality of received control signals (S1620).

Then, the drone transmits data to one or more base stations or performs a specific operation based on the combined control signal (S1630).

Here, the data may be received through at least one base station having the best received signal quality among the base stations.

Here, the number of base stations which transmits the plurality of control signals is different from the number of base stations which receives the data.

Further, the drone may receive information related to base stations selected by the central resource controller prior to or after the step of S1610

The method of transmitting and receiving signals between the drone and one or more base stations proposed in the present specification may be performed using the above mentioned MBMS.

General Apparatus to which an Embodiment of the Present Invention May be Applied FIG. 17 is a block diagram illustrating a wireless device in which methods as proposed herein may be implemented.

As shown in FIG. 17, a base station (or eNB) 1710 and the UE (or drone) 1720 include communication units (transmitting/receiving units, RF units, 1713 and 1723), processors 1711 and 1721, and memories 1712 and 1722.

The base station and the UE may further input units and output units.

The communication units 1713 and 1723, the processors 1711 and 1321, the input units, the output units, and the memories 1712 and 1722 are operatively connected with each other in order to conduct the methods as proposed herein.

The communication units (transmitting/receiving units or RF units, 1313 and 1323), when receiving information created from a Physical Layer (PHY) protocol, transfer the received information through Radio Frequency (RF) spectrums and conduct filtering and amplification, then transmit the results through antennas.

Furthermore, the communication units transfer Radio Frequency (RF) signals received through the antennas to bands capable of being processed by the PHY protocol, and perform filtering.

However, the communication units may also include the functions of switches to switch transmitting and receiving functions.

The processors 1711 and 1721 implement functions, procedures, and/or methods as proposed herein. The layers of radio interface protocols may be implemented by the processors.

The processors may be represented as control parts, controllers, control units, or computers.

The memories 1712 and 1722 are connected with the processors to store protocols or parameters for tracking a location vehicle UE.

The processor may include an application-specific integrated circuit (ASIC), a separate chipset, a logic circuit, and/or a data processing unit. The memory may include read-only memory (ROM), random access memory (RAM), flash memory, memory cards, storage media and/or other equivalent storage devices. The RF unit may include a base-band circuit for processing a radio signal. When the embodiment of the present invention is implemented in software, the aforementioned methods may be implemented with a module (or a process or a function) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Furthermore, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the tracking a location procedure as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Furthermore, the recording media readable by the processor may be distributed to computer systems connected with each other via a network, and processor readable codes may be stored and executed in a distributing manner.

INDUSTRIAL APPLICABILITY

Examples in which the method for transceiving a signal in a wireless communication system supporting zone-based communication according to an embodiment of the present invention has been applied to 3GPP LTE/LTE-A systems have been described, but the method may be applied to various wireless communication systems in addition to the 3GPP LTE/LTE-A systems.

The invention claimed is:

1. A method of transmitting and receiving, by a drone, a signal in a wireless communication system supporting a zone-based communication, the method comprising:
receiving a plurality of control signals from one or more base stations (BSs) included in at least one cluster;
combining the received control signals; and
transmitting data to one or more BSs or performing a specific operation based on the combined control signal,
wherein the at least one cluster is included in a zone defined as a set of BSs configured related to the drone,
wherein a duration of a cyclic prefix (CP) used in the plurality of control signals is categorized with a first CP, a second CP, and a third CP based on an altitude of the drone, and
wherein the first CP is used at a low altitude and the second CP is used at a medium altitude, and the third CP is used at a high altitude.

2. The method of claim 1, wherein the plurality of control signals includes the same control contents, and is repeatedly transmitted by the one or more BSs.

3. The method of claim 2, wherein the plurality of control signals are sequentially transmitted by each of the one or more BSs.

4. The method of claim 3, wherein when the plurality of control signals are sequentially transmitted, an order with which each of the control signals is transmitted is determined by at least one of a speed of the drone or trajectory information of the drone.

5. The method of claim 1, wherein the plurality of control signals includes at least one of an identifier of the at least one cluster or an identifier of the zone.

6. The method of claim 1, wherein a number of BSs which transmits the plurality of control signals is determined by a central resource controller or a serving BS.

7. The method of claim 6, wherein the serving BS is any one BS of the BSs.

8. The method of claim 6, wherein the number of BSs which transmits the plurality of control signals is determined based on at least one of signal quality of a drone, a speed of the drone, or trajectory information of the drone which is received from the BSs included in the at least one cluster.

9. The method of claim 1, wherein the specific operation is an operation for hovering the drone or an operation for safely landing the drones in emergency.

10. The method of claim 6, further comprising:
receiving information related to base stations selected by the central resource controller.

11. The method of claim 6, wherein the plurality of control signals are modulated by using any one of OFDM (Orthogonal Frequency Division Multiplexing) scheme, OFDMA (Orthogonal Frequency Division Multiple Access) scheme, CDMA scheme, SDMA or SC-FDMA (Single-Carrier Frequency Division Multiple Access) scheme.

12. The method of claim 1, wherein a subcarrier spacing used in the plurality of control signals is categorized with a plurality of factors based on a specific factor influencing channel characteristics.

13. The method of claim 12, wherein the specific factor includes at least one of an altitude of the drone, a speed of the drone, or weather information.

14. The method of claim 1, wherein the plurality of control signals are spread orthogonally or pseudo-orthogonally.

15. The method of claim 1, wherein the data is received through at least one BS having the best signal quality among the BSs.

16. The method of claim 6,
wherein the zone is an intra-zone or an inter-zone, and
wherein the number of BSs determined by the central resource controller is greater in the inter-zone than in the intra-zone.

17. The method of claim 1, wherein a number of BSs which transmits the plurality of control signals is different from a number of BSs which receives the data.

18. A drone of transmitting and receiving a signal in a wireless communication system supporting a zone-based communication, the drone comprising:
at least one transceiver; and
at least one process operatively coupled to the at least one transceiver,
wherein the at least one processor is configured to control to:
receive a plurality of control signals from one or more base stations (BSs) included in at least one cluster;
combine the received control signals; and
transmit data to one or more BSs or perform a specific operation based on the combined control signal,
wherein the at least one cluster is included in a zone defined as a set of BSs configured related to the drone,
wherein a duration of a cyclic prefix (CP) used in the plurality of control signals is categorized with a first CR a second CR and a third CP based on an altitude of the drone, and
wherein the first CP is used at a low altitude and the second CP is used at a medium altitude, and the third CP is used at a high altitude.

* * * * *